US012651469B2

(12) United States Patent　　　　　(10) Patent No.:　　US 12,651,469 B2
Higashikata et al.　　　　　　　　　(45) Date of Patent:　　　Jun. 9, 2026

(54) INFORMATION PROCESSING APPARATUS AND METHOD FOR DETERMINING AND DISPLAYING RELATIONSHIPS BETWEEN PRODUCT MANUFACTURING INFORMATION IN THREE-DIMENSIONAL MODEL DATA

(71) Applicant: FUJIFILM Business Innovation Corp., Tokyo (JP)

(72) Inventors: Ryosuke Higashikata, Kanagawa (JP); Tomonari Takahashi, Kanagawa (JP); Atsushi Ogihara, Kanagawa (JP); Yasuyuki Tanaka, Kanagawa (JP); Yumi Sekiguchi, Kanagawa (JP); Shunji Sakai, Kanagawa (JP); Yasushi Uemura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/901,471

(22) Filed: Sep. 1, 2022

(65) Prior Publication Data

US 2023/0306760 A1　　Sep. 28, 2023

(30) Foreign Application Priority Data

Mar. 24, 2022　　(JP) ................................. 2022-048233

(51) Int. Cl.
*G06V 20/64*　　　(2022.01)
*G06T 7/00*　　　　(2017.01)
*G06T 15/20*　　　(2011.01)

(52) U.S. Cl.
CPC .......... *G06V 20/653* (2022.01); *G06T 7/0004* (2013.01); *G06T 15/20* (2013.01)

(58) Field of Classification Search
None
See application file for complete search history.

(56) References Cited

U.S. PATENT DOCUMENTS

| | | | | |
|---|---|---|---|---|
| 2008/0269942 | A1* | 10/2008 | Free ........................ | G06F 30/00 |
| | | | | 700/182 |
| 2010/0114355 | A1* | 5/2010 | Harashima ............. | G06Q 50/04 |
| | | | | 700/107 |
| 2017/0148227 | A1* | 5/2017 | Alsaffar .................. | G06F 30/20 |
| 2019/0354639 | A1* | 11/2019 | Wu ........................... | G06F 9/54 |

(Continued)

FOREIGN PATENT DOCUMENTS

| | | | |
|---|---|---|---|
| JP | H07-104827 | A | 4/1995 |
| JP | 2002-328952 | A | 11/2002 |
| JP | 2022105917 | A　* | 7/2022 |

OTHER PUBLICATIONS

Fujii, JP-2022105917-A English Translation (Year: 2022).*

(Continued)

*Primary Examiner* — Miya J Cato
(74) *Attorney, Agent, or Firm* — Oliff PLC

(57) ABSTRACT
An information processing apparatus includes a processor configured to: determine a relationship between first product manufacturing information and second product manufacturing information included in three-dimensional model data; and generate, on a basis of the determined relationship, information indicating the relationship between the first product manufacturing information and the second product manufacturing information.

20 Claims, 32 Drawing Sheets

(56) References Cited

U.S. PATENT DOCUMENTS

| | | | | |
|---|---|---|---|---|
| 2020/0184125 A1* | 6/2020 | Machalica | ............. | G06F 30/12 |
| 2023/0045022 A1* | 2/2023 | Dupre | .................... | G06F 16/22 |
| 2024/0087106 A1* | 3/2024 | Sekiguchi | ............ | G06T 7/0004 |
| 2024/0411291 A1* | 12/2024 | Usui | ....................... | G06F 30/10 |

OTHER PUBLICATIONS

Jan. 6, 2026 Office Action issued in Japanese Patent Application No. 2022-048233.
Haghighi et al.; "Automated Tolerance Analysis of Mechanical Assemblies from a CAD Model with PMI," Computer-Aided Design and Applications; 17(2); 2020; pp. 249-273.
Lipman; "STEP File Analyzer User's Guide (Version 3);" National Institute of Standards and Technology; 2016; Apr. 27, 2018; DOI: 10.6028/NIST/IR.8122.

* cited by examiner

| IDENTIFICATION NUMBER | TYPE | VALUE | TED | RELATED PARTS |
|---|---|---|---|---|
| 41 | TED | 50 | YES | PART 51, PART 52 |
| 42 | SIZE TOLERANCE | 3 | NO | PART 51, PART 52 |
| 43 | GEOMETRIC TOLERANCE | 0. 1 | NO | PART 51, PART 52 |
| 44 | SIZE TOLERANCE | 7. 5 | NO | (OMITTED) |
| 45 | BALLOON SYMBOL | 79 | NO | — |
| 46 | CALIPER INSTRUCTION | — | NO | — |

FIG. 12

| IDENTIFICATION NUMBER | TYPE | VALUE | IDENTIFICATION NUMBER OF PARENT PMI | IDENTIFICATION NUMBER OF CHILD PMI |
|---|---|---|---|---|
| 41 | TED | 50 | 43 | — |
| 42 | SIZE TOLERANCE | 3 | — | 43 |
| 43 | GEOMETRIC TOLERANCE | 0.1 | 42 | 41 |
| 44 | SIZE TOLERANCE | 7.5 | — | 45, 46 |
| 45 | BALLOON SYMBOL | 79 | 44 | — |
| 46 | CALIPER INSTRUCTION | — | 44 | — |

FIG. 14

| IDENTIFICATION NUMBER | TYPE | FEATURE AND MEANING | ENTITY TYPE IN DXF DATA |
|---|---|---|---|
| 61 | SIZE TOLERANCE | DIMENSION SUCH AS LENGTH, ANGLE, OR DIAMETER | DIMENSION |
| 62 | GEOMETRIC TOLERANCE | IN GEOMETRIC TOLERANCE FRAME | TOLERANCE |
| 63 | TED | DIMENSION IN RECTANGLE WITHOUT TOLERANCE | DIMENSION |
| 64 | DATUM TARGET | INDICATES POSITION OF DATUM | INSERT |
| 65 | NOTE FLAG | NUMBER IN PENTAGON | INSERT |
| 66 | CALIPER INSTRUCTION | I OR L IN TRIANGLE | INSERT |
| 67 | DESIGN CHANGE SYMBOL | INDICATES DESIGN CHANGE WITH THREE-DIGIT NUMBER IN TRIANGLE | INSERT |
| 68 | BALLOON SYMBOL | INDICATES ORDER OF INSPECTION WITH NUMBER IN CIRCLE | INSERT |

| INSPECTION NUMBER | TYPE | | DIMENSION | UPPER TOLERANCE LIMIT | LOWER TOLERANCE LIMIT | . . . . |
|---|---|---|---|---|---|---|
| 10 | φL | | 6.500 | 0.200 | -0.200 | |
| 11 | POSITION φL | | 0.000 | 0.100 | 0.000 | |
| 11 | | X | 20.000 | EXT | | |
| 11 | | Y | 10.000 | EXT | | |
| 12 | φR | | 6.500 | 0.200 | -0.200 | |
| 13 | POSITION φR | | 0.000 | 0.100 | 0.000 | |
| 13 | | X | 80.000 | EXT | | |
| 13 | | Y | 10.000 | EXT | | |
| 14 | φL | | 2.600 | 0.100 | -0.100 | |
| 15 | POSITION φL | | 0.000 | 0.100 | 0.000 | |
| 15 | | X | 20.000 | EXT | | |
| 15 | | Y | 10.000 | EXT | | |
| 16 | φR | | 2.600 | 0.100 | -0.100 | |
| 17 | POSITION φR | | 0.000 | 0.100 | 0.000 | |
| 17 | | X | 80.000 | EXT | | |
| 17 | | Y | 10.000 | EXT | | |

SAME GROUP (inspection numbers 10–13)

SAME GROUP (inspection numbers 14–17)

FIG. 30

| INSPECTION NUMBER | TYPE | DIMENSION | UPPER TOLERANCE LIMIT | LOWER TOLERANCE LIMIT | .... |
|---|---|---|---|---|---|
| 10 | φL | 6.500 | 0.200 | -0.200 | |
| 11 | POSITION φL | 0.000 | 0.100 | 0.000 | |
| 11 | X | 20.000 | EXT | | |
| 11 | Y | 10.000 | EXT | | |
| 14 | φL | 2.600 | 0.100 | -0.100 | |
| 15 | POSITION φL | 0.000 | 0.100 | 0.000 | |
| 15 | X | 20.000 | EXT | | |
| 15 | Y | 10.000 | EXT | | |
| 12 | φR | 6.500 | 0.200 | -0.200 | |
| 13 | POSITION φR | 0.000 | 0.100 | 0.000 | |
| 13 | X | 80.000 | EXT | | |
| 13 | Y | 10.000 | EXT | | |
| 16 | φR | 2.600 | 0.100 | -0.100 | |
| 17 | POSITION φR | 0.000 | 0.100 | 0.000 | |
| 17 | X | 80.000 | EXT | | |
| 17 | Y | 10.000 | EXT | | |

SAME SET (inspection numbers 10–15)

SAME SET (inspection numbers 12–17)

INFORMATION PROCESSING APPARATUS AND METHOD FOR DETERMINING AND DISPLAYING RELATIONSHIPS BETWEEN PRODUCT MANUFACTURING INFORMATION IN THREE-DIMENSIONAL MODEL DATA

CROSS-REFERENCE TO RELATED APPLICATIONS

This application is based on and claims priority under 35 USC 119 from Japanese Patent Application No. 2022-048233 filed Mar. 24, 2022.

BACKGROUND

(i) Technical Field

The present disclosure relates to an information processing apparatus, a non-transitory computer readable medium, and a method.

(ii) Related Art

Japanese Unexamined Patent Application Publication No. 7-104827 discloses a process management system that creates, from design drawing information, inspection drawing information that serves as a reference for comparison and measurement information for controlling measurement means, that evaluates manufacturing errors on the basis of a result of measurement input from the measurement means and the inspection drawing information, and that creates inspection result information obtained by comparing the inspection drawing information and the result of the measurement for a desired display mode while associating the inspection result information with the design drawing information.

Japanese Unexamined Patent Application Publication No. 2002-328952 discloses a computer-aided design (CAD) apparatus that, for a CAD model to which created attribute information such as dimensions and size tolerances is added, groups the attribute information for each of operation steps and adds measurement information and that performs post-process utilization information in order to improve efficiency in a process performed after measurement.

SUMMARY

During these years, in three-dimensional CAD, not only product shape information indicating shapes of products to be formed but also specification information such as nominal dimensions (also called "nominal sizes") and tolerances is included in three-dimensional model data as product manufacturing information (PMI). In doing so, when a three-dimensional model is displayed, the PMI can be displayed on the three-dimensional model as three-dimensional annotations, and necessary information such as nominal dimensions and tolerances can be found without using a two-dimensional drawing.

Such three-dimensional model data is used in various processes after a design process, such as an estimation process, a drawing check process, a model design process, a jig design process, and an inspection process.

Each of pieces of PMI, however, is added to three-dimensional model data as independent information. When processing based on the three-dimensional model data is performed in each of the processes after the design process, therefore, interpretation of the pieces of PMI consistent between the processes might be difficult or interpretation by a person might be necessary. Consequently, it is difficult to use PMI efficiently.

Aspects of non-limiting embodiments of the present disclosure relate to an information processing apparatus, a non-transitory computer readable medium, and a method capable of making it easier to use PMI included in three-dimensional model data than when pieces of PMI are independent from one another.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: determine a relationship between first product manufacturing information and second product manufacturing information included in three-dimensional model data; and generate, on a basis of the determined relationship, information indicating the relationship between the first product manufacturing information and the second product manufacturing information.

BRIEF DESCRIPTION OF THE DRAWINGS

An exemplary embodiment of the present disclosure will be described in detail based on the following figures, wherein:

FIG. 7 is a perspective view of an elongated hole in the three-dimensional data illustrated in FIG. 6;

FIG. 9 is a diagram illustrating an example of PMI detected from the three-dimensional model data illustrated in FIGS. 6 and 8;

FIG. 12 is a diagram illustrating an example of information indicating relationships between a plurality of pieces of PMI;

FIG. 14 is a diagram illustrating a list of types of pieces of PMI included in the DXF data regarding the two-dimensional drawing illustrated in FIG. 13;

FIG. 20 is a diagram illustrating an example of display where a size tolerance has been clicked;

FIG. 21 is a diagram illustrating an example of display where the size tolerance has been double-clicked;

FIG. 22 is a diagram illustrating an example of display where another size tolerance has been clicked;

FIG. 29 is a diagram illustrating an example of an inspection table generated by arranging, by groups, the pieces of PMI regarding the inspection targets; and FIG. 30 is a diagram illustrating an example of an inspection table generated by arranging, by sets, the pieces of PMI regarding the inspection targets.

DETAILED DESCRIPTION

Next, an exemplary embodiment of the present disclosure will be described in detail with reference to the drawings.

Figure 1:
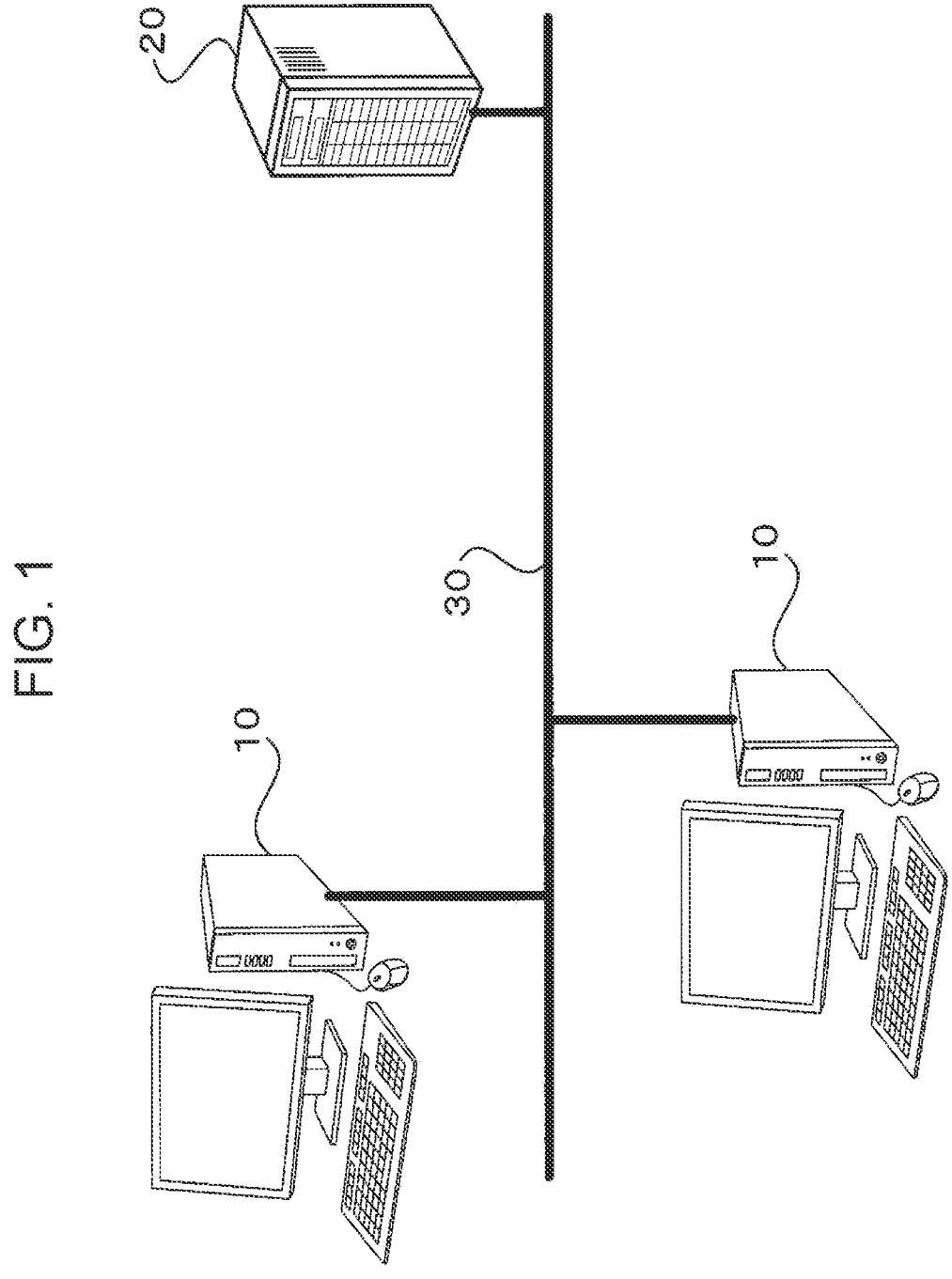
FIG. 1 is a diagram illustrating the system configuration of a drawing data processing system according to an exemplary embodiment of the present disclosure.

FIG. 1 is a diagram illustrating the system configuration of a drawing data processing system according to the exemplary embodiment of the present disclosure.

As illustrated in FIG. 1, the drawing data processing system according to the exemplary embodiment of the present disclosure includes a plurality of terminal apparatuses 10 and a drawing data management server 20 connected to one another over a network 30. The drawing data management server 20 manages drawing data, such as part drawings and product drawings, for designing various products. The terminal apparatuses 10 are information processing apparatuses having functions of downloading and displaying the drawing data managed by the drawing data management server 20, performing various operations on the downloaded drawing data, such as correction and change, and uploading the drawing data to the drawing data management server 20.

Here, the drawing data managed by the drawing data management server 20 is, for example, three-dimensional model data including not only product shape information indicating shapes of product to be formed but also specification information such as nominal dimensions and tolerances as PMI.

Figure 2:
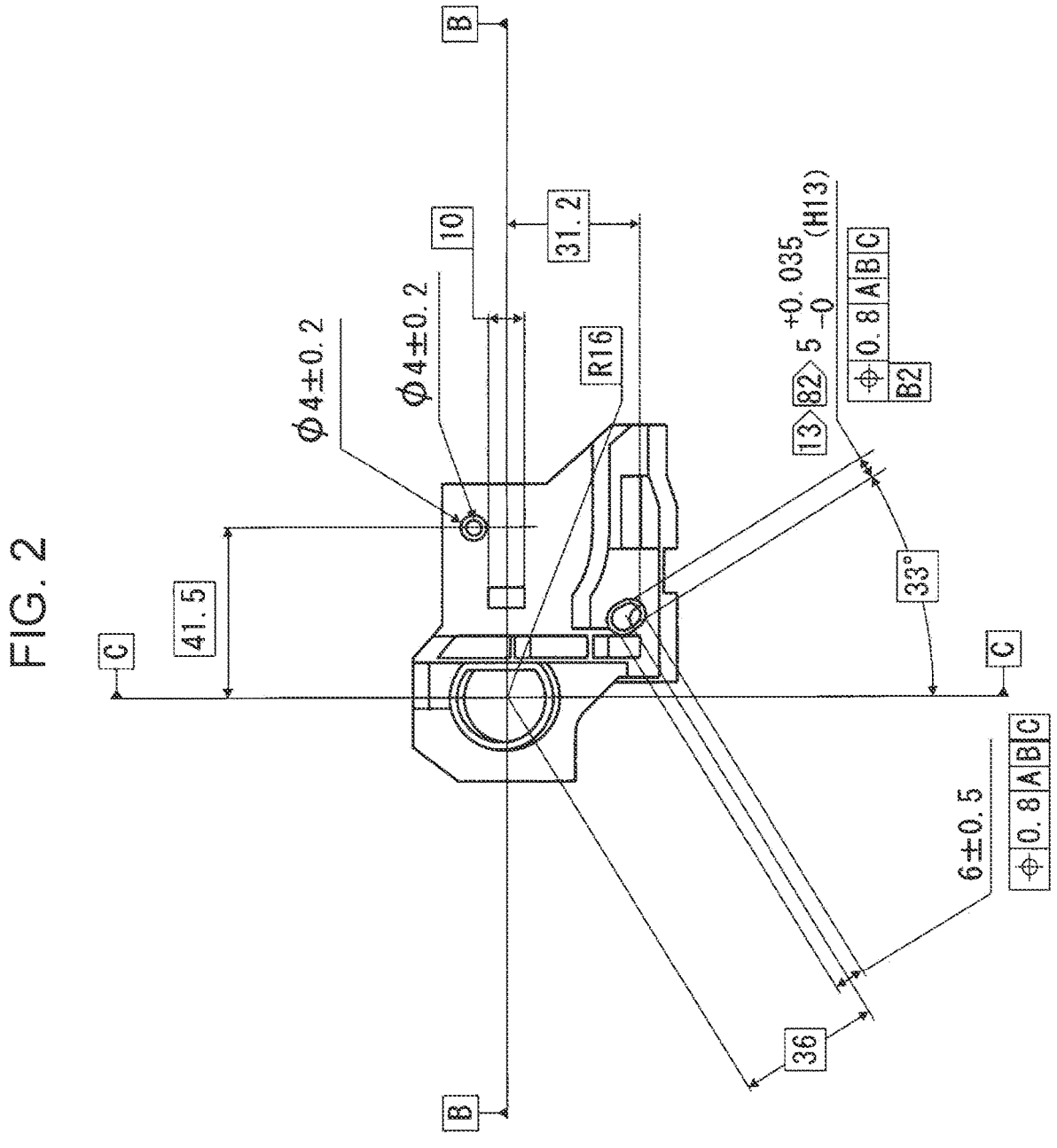
FIG. 2 is a diagram illustrating an example of three-dimensional model data including PMI.

FIG. 2 illustrates an example of such three-dimensional model data including PMI. In FIG. 2, various pieces of PMI such as size tolerances, geometric tolerances, and TEDs are displayed on the three-dimensional model as three-dimensional annotations.

Figure 3:
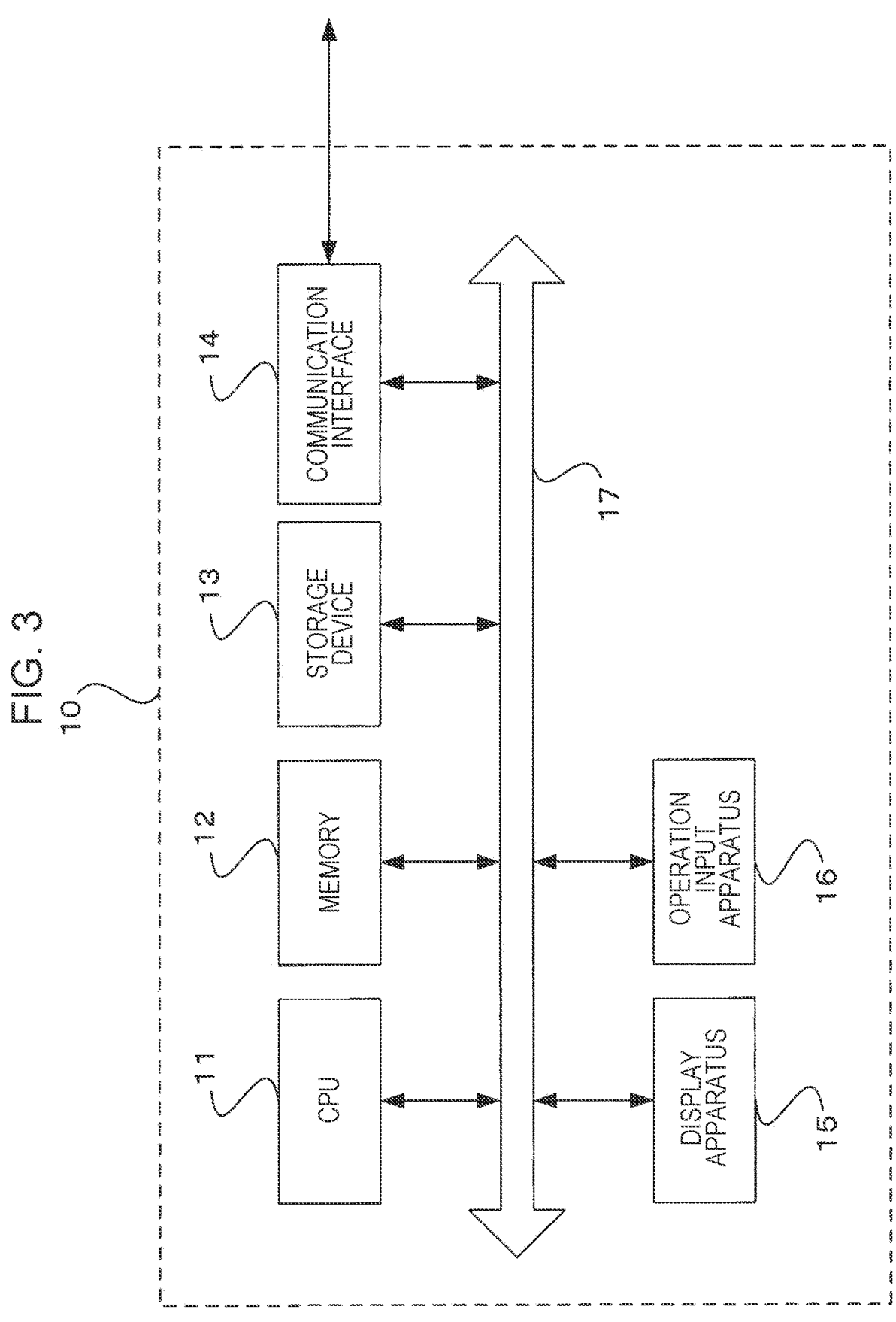
FIG. 3 is a block diagram illustrating the hardware configuration of terminal apparatuses according to the exemplary embodiment.

Next, FIG. 3 illustrates the hardware configuration of the terminal apparatuses 10 in the drawing data processing system according to the present exemplary embodiment.

As illustrated in FIG. 3, the terminal apparatuses 10 each include a central processing unit (CPU) 11, a memory 12, a storage device 13 such as a hard disk drive, a communication interface 14 that communicates data with external apparatuses over the network 30, a display apparatus 15 such as a liquid crystal display, and an operation input apparatus 16 including a touch panel or a keyboard. These components are connected to one another through a control but 17.

The CPU 11 is a processor that controls the operation of the terminal apparatus 10 by performing certain processing on the basis of a control program stored in the memory 12 or the storage device 13. Although the CPU 11 reads and executes the control program stored in the memory 12 or the storage device 13 in the present exemplary embodiment, the control program need not be stored in the memory 12 or the storage device 13. The control program may be stored in a computer readable medium and provided, instead. For example, the control program may be stored in an optical disc such as a compact disc read-only memory (CD-ROM) or a digital versatile disc read-only memory (DVD-ROM) or a semiconductor memory such as a universal serial bus (USB) memory or a memory card and provided, instead. Alternatively, the control program may be obtained from an external apparatus over a communication network connected to the communication interface 14.

Figure 4:
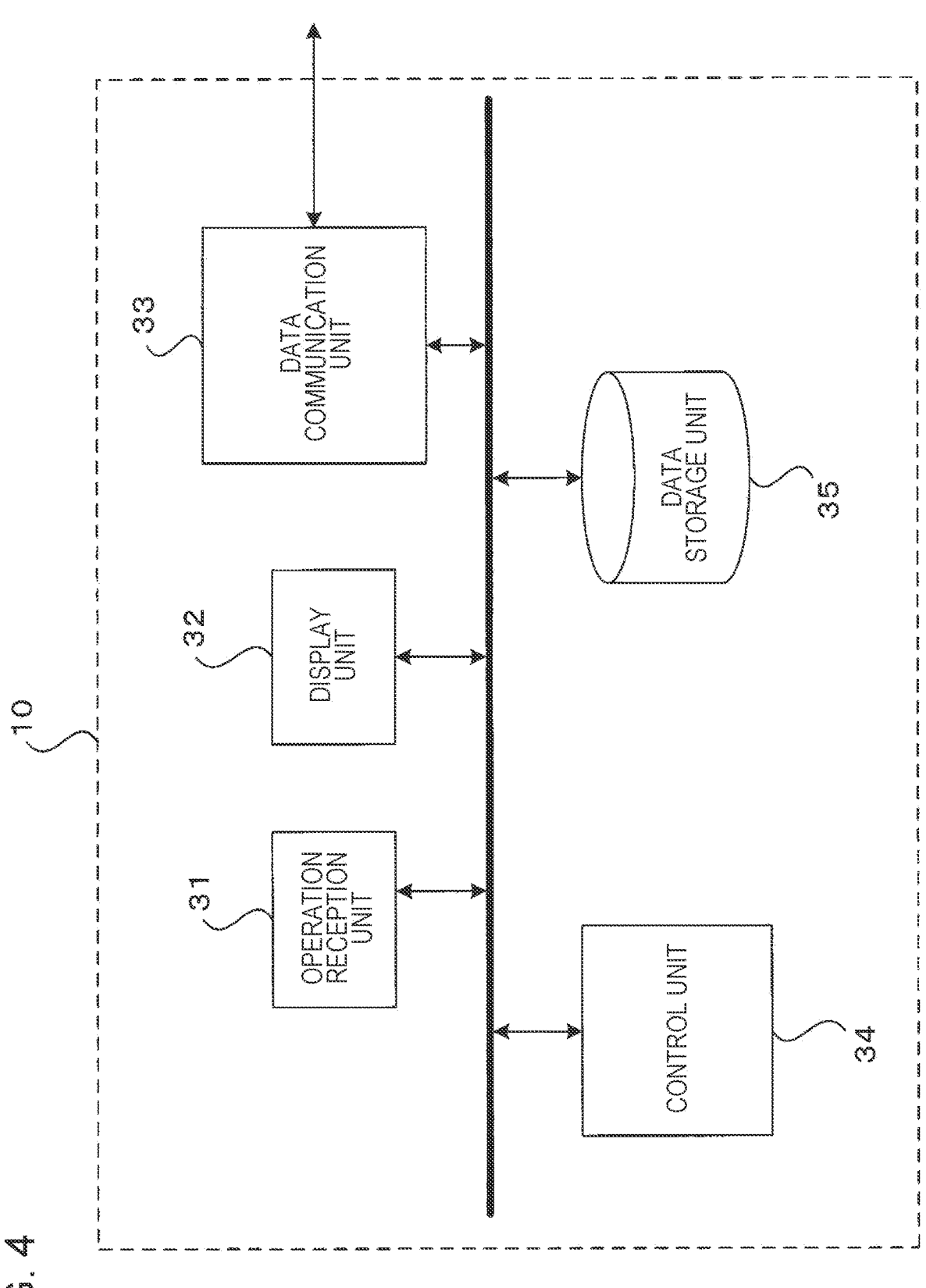
FIG. 4 is a block diagram illustrating the functional configuration of the terminal apparatuses according to the exemplary embodiment of the present disclosure.

FIG. 4 is a block diagram illustrating the functional configuration of the terminal apparatuses 10 achieved by executing the control program.

As illustrated in FIG. 4, the terminal apparatuses 10 according to the present exemplary embodiment each include an operation reception unit 31, a display unit 32, a data communication unit 33, a control unit 34, and a data storage unit 35.

The data communication unit 33 communicates data with an external apparatus such as the drawing data management server 20.

The display unit 32 is controlled by the control unit 34 and displays various pieces of information for a user. The operation reception unit 31 receives various operations performed by the user.

The control unit 34 receives drawing data from the drawing data management server 20 through the data communication unit 33, stores the drawing data in the data storage unit 35, and displays the drawing data stored in the data storage unit 35 on the display unit 32. The control unit 34 also changes the drawing data stored in the data storage unit 35 on the basis of a user operation received by the operation reception unit 31 and uploads the changed drawing data to the drawing data management server 20 through the data communication unit 33.

Such drawing data is used in not only a design process but also various later processes including an estimation process, a drawing check process, a model design process, a jig design process, and an inspection process.

Each of pieces of PMI, however, is added to three-dimensional model data as independent information. When processing based on the three-dimensional model data is performed in each of the processes after the design process, therefore, interpretation of the pieces of PMI between the processes is difficult, and it is accordingly difficult to use the pieces of PMI, if the pieces of PMI remain independent from one another. In addition, when a person interprets the pieces of PMI on the three-dimensional model data and determine operations to be performed, the amount of data that can be handled might be limited, errors might occur when operations are performed using drawing data, variation from person to person might occur, and various other problems might arise.

In the present exemplary embodiment, therefore, the control unit 34 performs the following operations to make it easier to use pieces of PMI included in three-dimensional model data than when the pieces of PMI are independent from one another.

The control unit 34 determines a relationship between first PMI and second PMI, that is, a plurality of pieces of PMI, included in three-dimensional model data and generates information indicating the relationship between the first PMI and the second PMI on the basis of the determined relationship.

For example, the control unit 34 recognizes forms relating to a three-dimensional shape indicated by a plurality of pieces of PMI and determines a relationship between the plurality of pieces of PMI on the basis of the recognized forms.

In addition, for example, the control unit 34 determines that there is a relationship between a piece of PMI which defines a geometric tolerance and a piece of PMI which defines a TED indicating the same form as the geometric tolerance does and generates information indicating a parent-child relationship where the piece of PMI which defines the geometric tolerance is a parent and the piece of PMI which defines the TED is a child.

In addition, for example, the control unit 34 determines that there is a correspondence between at least two pieces of PMI in which defined geometric tolerances or size tolerances indicate the same form, and generates information indicating that the at least two pieces of PMI have the correspondence. In the following description, pieces of PMI having such a correspondence will be referred to as "pieces of PMI belonging to the same set".

Furthermore, the control unit 34 determines that a plurality of pieces of PMI determined to have a correspondence belong to the same group, and generates information indicating that the plurality of pieces of PMI belong to the same group. Here, pieces of PMI belonging to the same group refer to a plurality of pieces of PMI that define the same specification, such as the same size tolerance or the same geometric tolerance, for different parts.

The control unit 34 determines that there is a relationship between a piece of PMI which defines a geometric tolerance or a piece of PMI which defines a size tolerance and a piece of PMI that defines supplementary information regarding the foregoing piece of PMI, and generates information indicating a parent-child relationship where the piece of PMI which defines the geometric tolerance or the size tolerance is a parent and the piece of PMI which defines the supplementary information is a child.

Furthermore, the control unit 34 determines that at least two pieces of PMI which define the same size tolerance or at least two pieces of PMI which define the same geometric tolerance belong to the same group, and generates information indicating the at least two pieces of PMI belong to the same group.

When the control unit 34 has determined that two pieces of PMI have a relationship and generated information indicating the relationship between the two pieces of PMI, the control unit 34 includes the generated information in one or both of the two pieces of PMI.

Alternatively, even when the control unit 34 has determined that two pieces of PMI have a relationship and generated information indicating the relationship between the two pieces of PMI, the control unit 34 may hold the generated information as independent information without including the information in none of the two pieces of PMI.

The control unit 34 may output generated information indicating a relationship between a plurality of pieces of PMI to an external apparatus through the data communication unit 33 while including the information in three-dimensional model data. When the control unit 34 outputs only pieces of PMI that satisfy a set condition among a large number of PMI included in the three-dimensional data, the control unit 34 may output only pieces of PMI selected on the basis of the information indicating the relationship between the plurality of pieces of PMI.

In addition, after generating information indicating relationships between a plurality of pieces of PMI in this manner, the control unit 34 may generate, using the generated information, an inspection table for inspecting parts and the like manufactured on the basis of the three-dimensional data.

When generating the inspection table, the control unit 34 outputs the plurality of pieces of PMI in order based on the generated information indicating the relationships between the plurality of pieces of PMI. A mode in which the control unit 34 outputs the plurality of pieces of PMI in the order based on the generated information indicating the relationships between the plurality of pieces of PMI includes a mode in which the control unit 34 displays the plurality of pieces of PMI on the display unit 32.

The control unit 34 displays the three-dimensional model data on the display unit 32 using the information indicating the relationships between the plurality of pieces of PMI. When the control unit 34 displays only pieces of PMI that satisfy a set condition by filtering a large number of pieces of PMI included in the three-dimensional model data, for example, the control unit 34 displays, on the display unit 32, only pieces of PMI selected on the basis of the information indicating the relationships between the plurality of pieces of PMI.

More specifically, the control unit 34 may display, among the pieces of PMI displayed on the display unit 32, only pieces of PMI relating to a form selected by the user, pieces of PMI belonging to the same group as a piece of PMI selected by the user, or pieces of PMI belonging to the same set as a piece of PMI selected by the user.

Next, operations performed by the terminal apparatuses 10 in the drawing data processing system according to the present exemplar embodiment will be described in detail with reference to the drawings.

Figure 5:
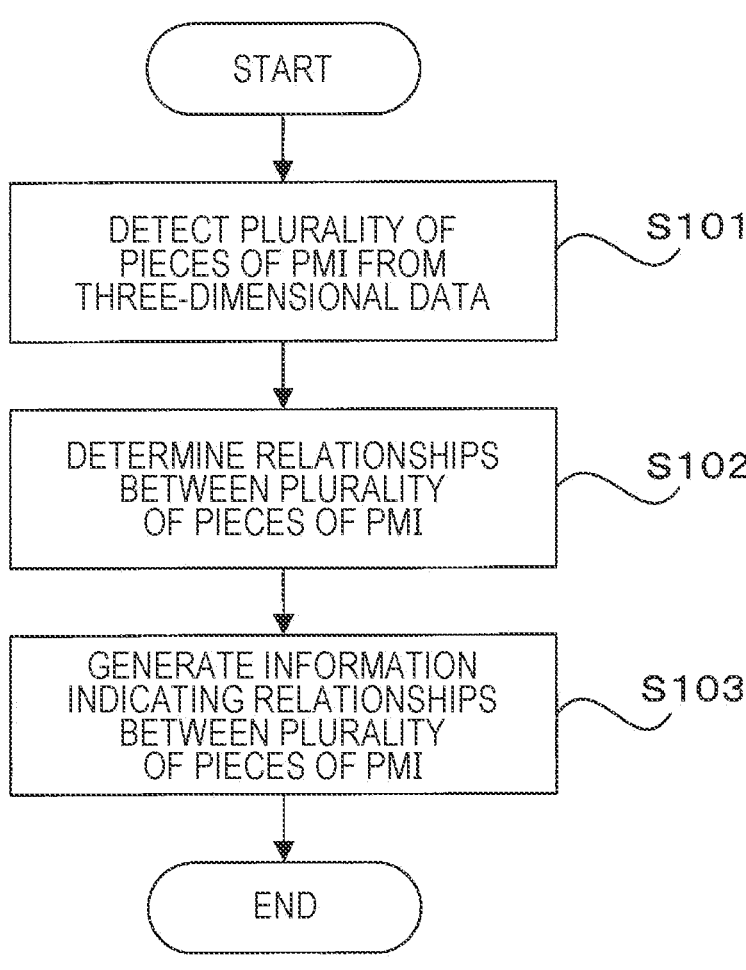
FIG. 5 is a flowchart illustrating an outline of operations performed by one of the terminal apparatuses to generate information indicating a relationship between a plurality of pieces of PMI on the basis of three-dimensional model data including the plurality of pieces of PMI.

First, an outline of operations performed by one of the terminal apparatuses 10 to generate information indicating relationships between a plurality of pieces of PMI on the basis of three-dimensional model data including the plurality of pieces of PMI will be described with reference to a flowchart of FIG. 5.

First, in step S101, the control unit 34 detects a plurality of pieces of PMI included in drawing data stored in the data storage unit 35, such as three-dimensional model data.

Next, in step S102, the control unit 34 determines relationships between the plurality of pieces of PMI on the basis of the plurality of detected pieces of PMI.

In step S103, the control unit 34 generates information indicating the determined relationship between the plurality of pieces of PMI. The control unit 34 may add the generated information indicating the relationships between the plurality of pieces of PMI to the corresponding pieces of PMI determined to have the relationships or to the three-dimensional model data as information independent of the plurality of pieces of PMI determined to have the relationships. Alternatively, the control unit 34 may hold the generated information indicating the relationships between the plurality of pieces of PMI as independent information different from the three-dimensional model data.

Next, a specific example of the process for detecting a plurality of pieces of PMI described in step S101 of the flowchart of FIG. 5 will be described with reference to FIGS. 6 to 9.

In general, PMI is associated on three-dimensional model data with parts relating to a three-dimensional shape in order to indicate which parts nominal dimensions, which are also called nominal sizes, and tolerances correspond to. In the three-dimensional model data illustrated in FIG. 6, for example, an elongated hole 50 is provided in a part of an elongated plate, and a TED 41, a size tolerance 42, and a geometric tolerance 43 are defined by PMI.

Figure 7:
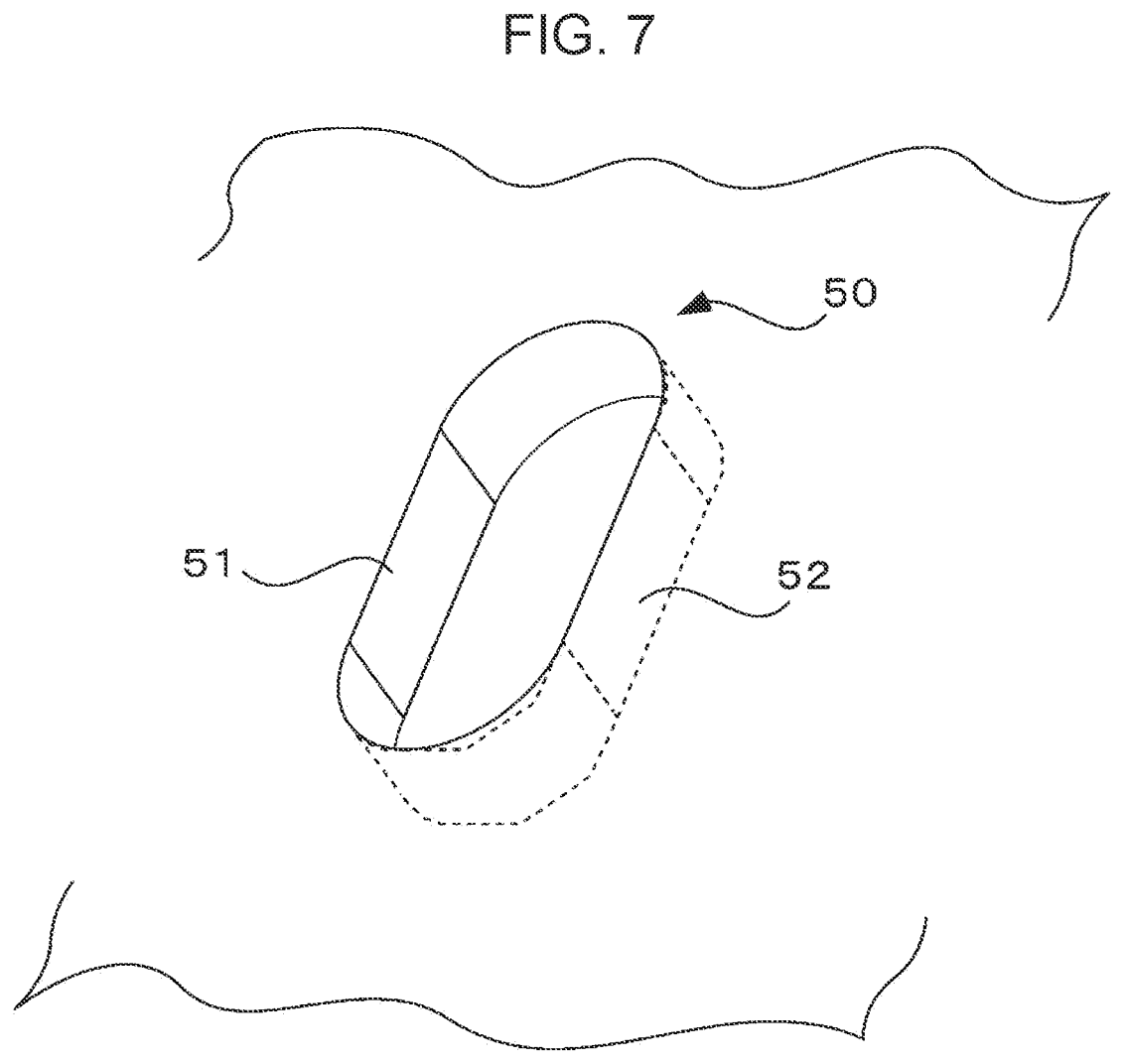

FIG. 7 is a perspective view of the elongated hole 50. Here, two side surfaces of the elongated hole 50 will be referred to as "parts 51 and 52", respectively.

In this case, the TED 41 indicates a distance from a datum C to a central line between the parts 51 and 52. The size tolerance 42 indicates a distance between the parts 51 and 52. The geometric tolerance 43 indicates a tolerance of the TED 41, that is, the distance from the datum C to the central line between the parts 51 and 52.

Figure 8:
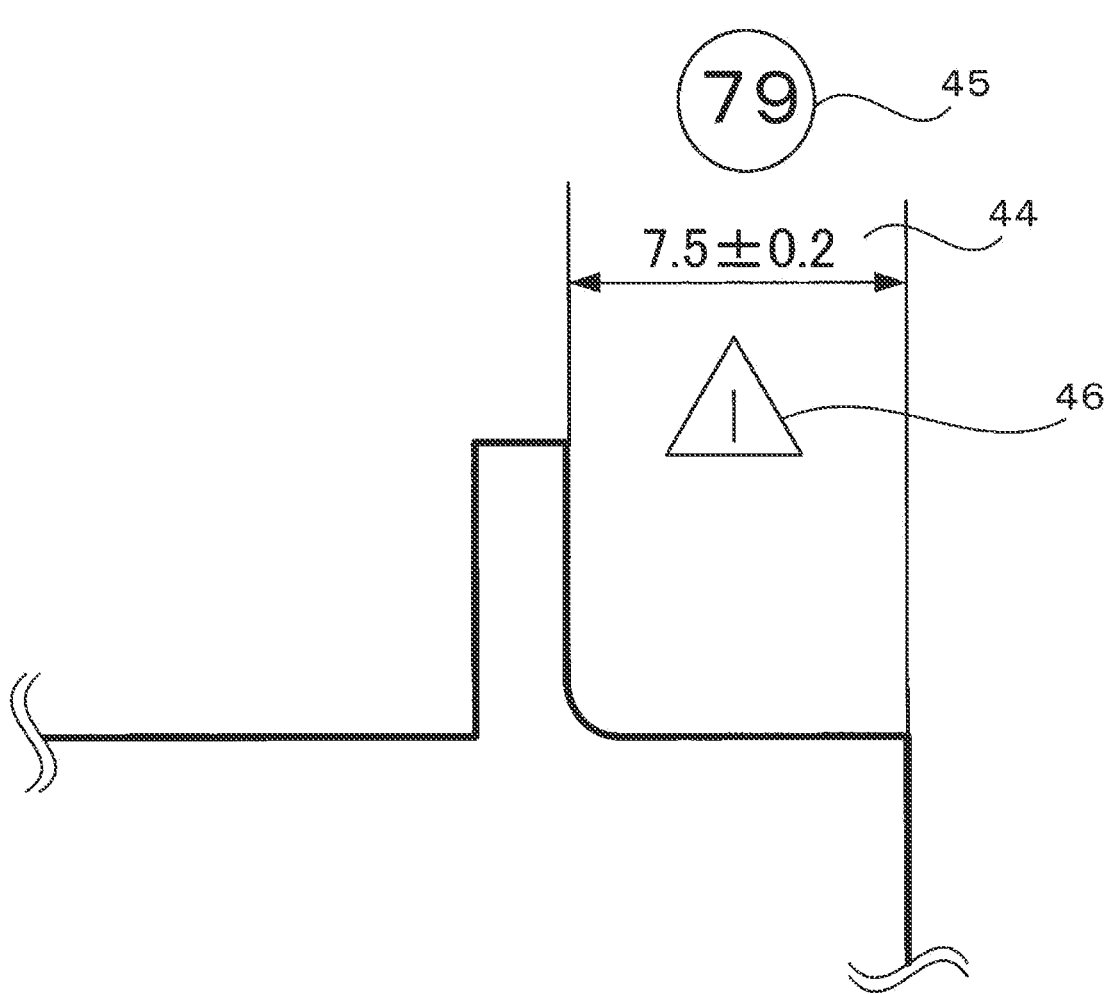
FIG. 8 is a diagram illustrating another example of the three-dimensional model data.

On three-dimensional model data, a piece of PMI might be attached to another piece of PMI as supplementary information. In FIG. 8, for example, a size tolerance 44, a balloon symbol 45, and a caliper instruction 46 have the following attachment relationship. The balloon symbol 45 indicates that the size tolerance 44 is a 79th inspection item. The caliper instruction 46 indicates a method used to measure the size tolerance 44. Here, a caliper instruction is an instruction about a measurement method indicating, for example, that when a distance between two surfaces is measured, it is only required that the distance be measured at one position.

Figure 6:
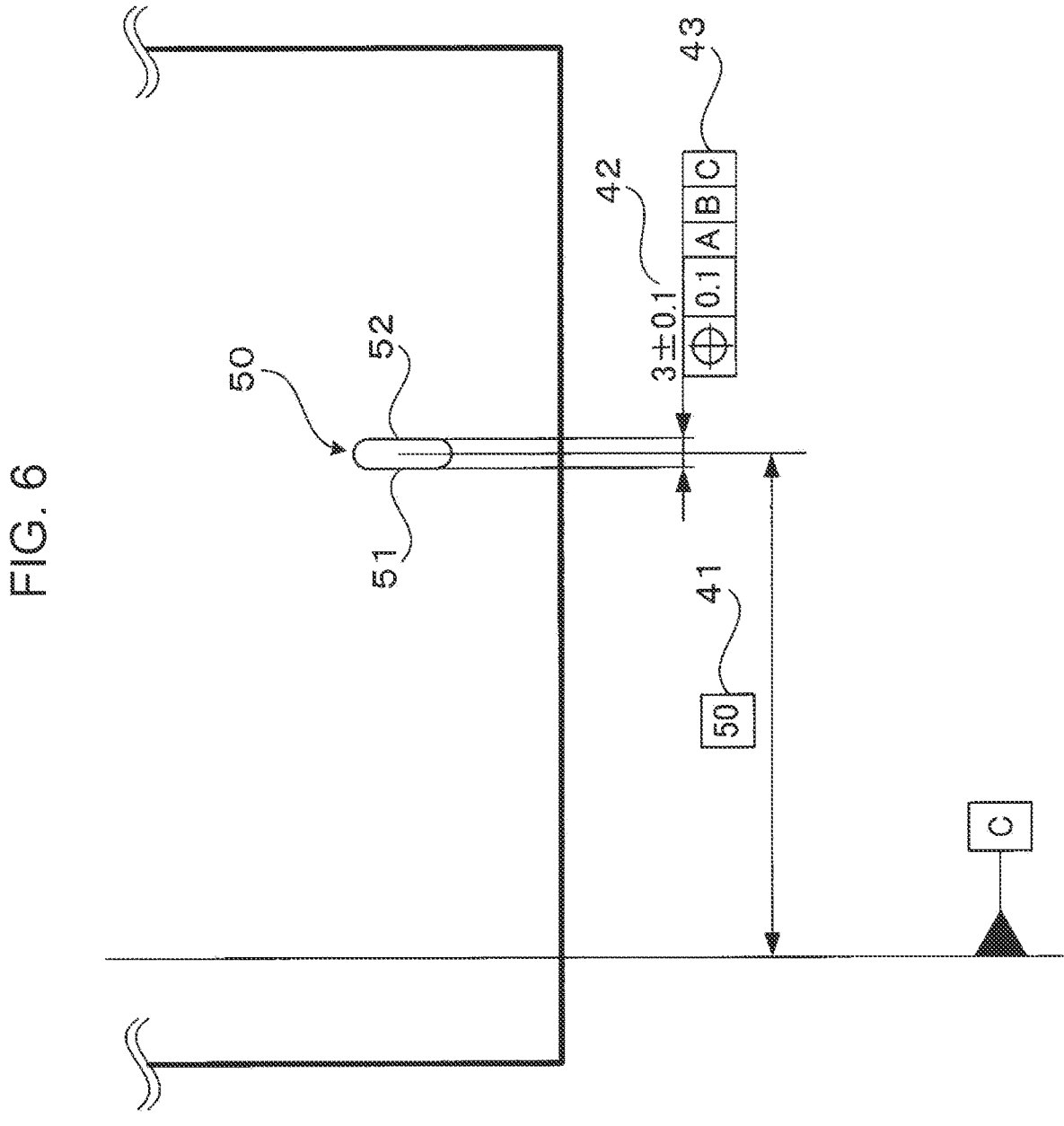
FIG. 6 is a diagram illustrating an example of three-dimensional model data.

FIG. 9 illustrates an example of the PMI detected from the three-dimensional model data illustrated in FIGS. 6 and 8. Association between pieces of PMI and forms can be extracted from three-dimensional data using a software development kit (SDK) or the like. The example of the PMI illustrated in FIG. 9 includes only part of available information in order to simplify the description, and other pieces of information can also be obtained in practice.

In practice, each of the pieces of PMI is given an identification number with which the piece of PMI is identified, but in FIG. 9, the reference numeral given to each of the pieces of PMI is used for the identification instead of the identification number, in order to simplify the description.

As illustrated in FIG. 9, each of the pieces of PMI obtained from the three-dimensional model data includes an identification number, a type, a value, information indicating whether the piece of PMI is a TED, and information indicating related parts.

Next, the control unit 34 determines relationships between the plurality of pieces of PMI detected from the three-dimensional model data on the basis of the plurality of pieces of PMI. An example of types of relationship and conditions will be described in the following (1) to (3).

(1) Parent-Child Relationship where Size Tolerance is Parent and Geometric Tolerance is Child If related parts of a piece of PMI whose type is a size tolerance and related parts of a piece of PMI whose type is a geometric tolerance at least partly match, the control unit 34 determines that the size tolerance and the geometric tolerance have a parent-child relationship.

Figure 10:
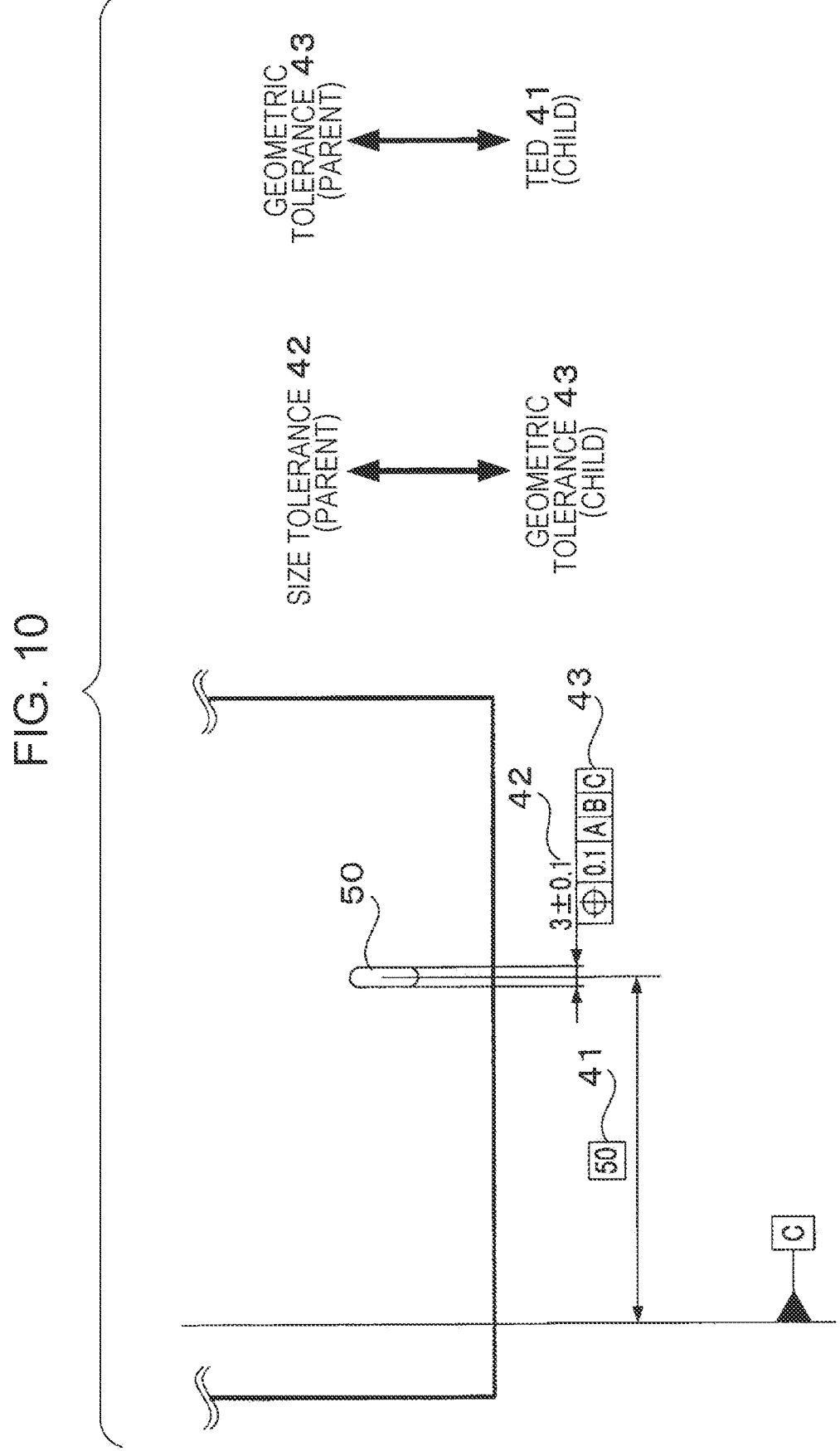
FIG. 10 is a diagram illustrating a result of a determination as to relationships between a size tolerance as a parent, a geometric tolerance, and a theoretically exact dimension (TED)

More specifically, in the example illustrated in FIG. 6, the control unit 34 determines, as illustrated in FIG. 10, that there is a parent-child relationship where the size tolerance 42 is a parent and the geometric tolerance 43 is a child.

(2) Parent-Child Relationship where Geometric Tolerance is Parent and TED is Child If related parts of a piece of PMI whose type is a geometric tolerance and related parts of a piece of PMI whose type is a TED at least partly match, the control unit 34 determines that the geometric tolerance and the TED have a parent-child relationship.

More specifically, in the example illustrated in FIG. 6, the control unit 34 determines, as illustrated in FIG. 10, that there is a parent-child relationship where the geometric tolerance 43 is a parent and the TED 41 is a child.

(3) Parent-Child Relationship where Size Tolerance or Geometric Tolerance is Parent and Piece of PMI that Defines Supplementary Information Regarding Parent PMI is Child If there is a piece of PMI attached to another piece of PMI whose type is a size tolerance, the control unit 34 determines that the size tolerance or the geometric tolerance and the attached piece of PMI have a parent-child relationship.

Figure 11:
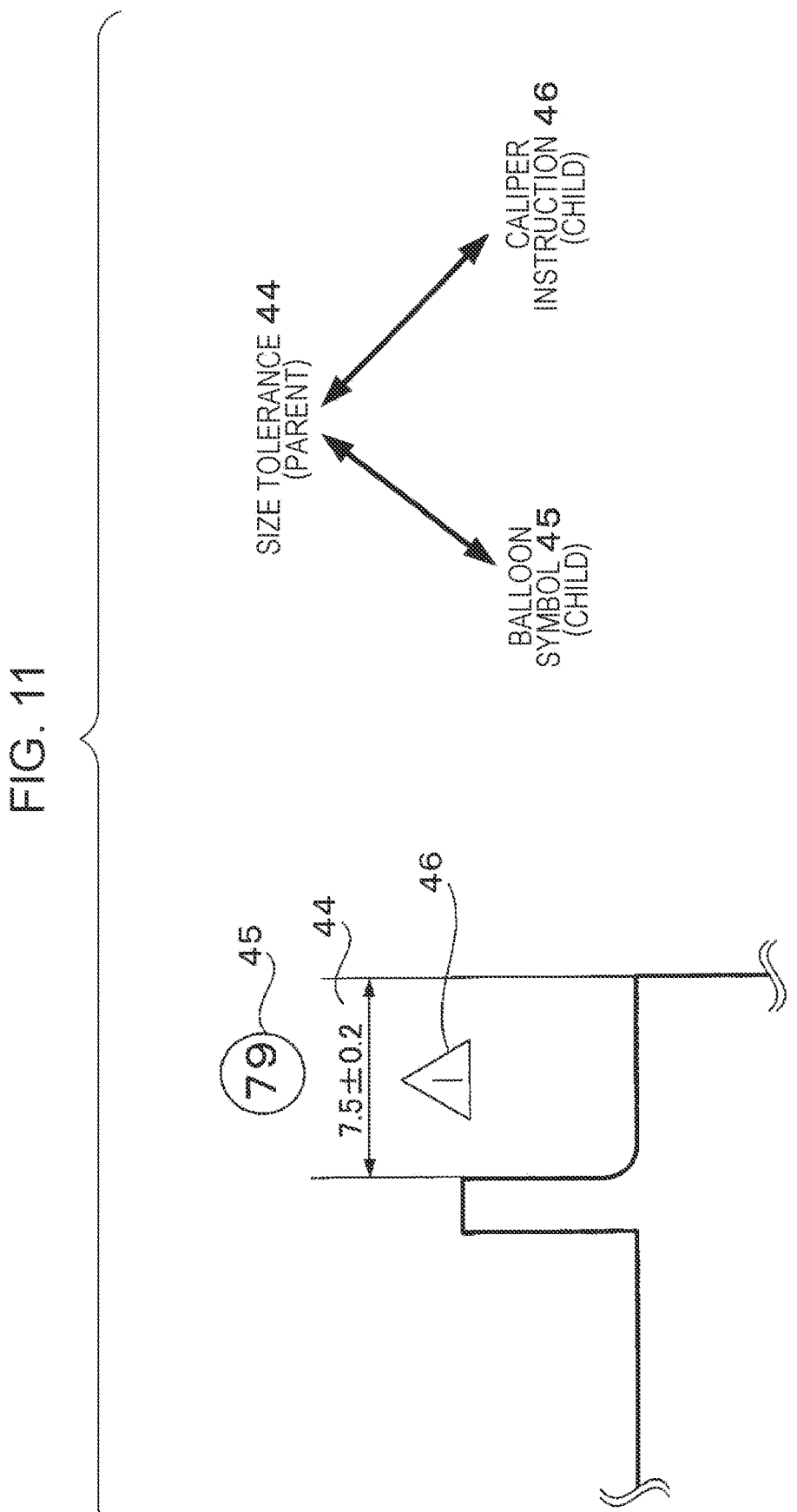
FIG. 11 is a diagram illustrating a result of a determination as to a relationship between a size tolerance as a parent, a balloon symbol, and a caliper instruction.

More specifically, in the example illustrated in FIG. 6, the control unit 34 determines, as illustrated in FIG. 11, that there is a parent-child relationship where the size tolerance 44 is a parent and the balloon symbol 45 and the caliper instruction 46 are children. Such a parent-child relationship can be determined because a size tolerance or a geometric tolerance and supplementary information regarding the size tolerance or the geometric tolerance are displayed together as three-dimensional annotations.

The control unit 34 generates information indicating relationships between a plurality of pieces of PMI on the basis of results of determinations, which are achieved by the above method, as to the relationships between the plurality of pieces of PMI. FIG. 12 illustrates an example of information indicating relationships between a plurality of pieces of PMI generated in this manner. FIG. 12 illustrates an example of information indicating relationships determined in FIGS. 10 and 11.

In FIG. 12, an identification number of parent PMI and/or an identification number of child PMI are given to each of pieces of PMI. For example, parent PMI of the TED 41 is the geometric tolerance 43, and child PMI of the size tolerance 42 is the geometric tolerance 43. Similarly, parent PMI of the geometric tolerance 43 is the size tolerance 42, and child PMI of the geometric tolerance 43 is the TED 41.

In FIG. 12, child PMI of the size tolerance 44 is the balloon symbol 45 and the caliper instruction 46, and parent PMI of the balloon symbol 45 and the caliper instruction 46 is the size tolerance 44.

That is, the information illustrated in FIG. 12 indicates parent-child relationships between the pieces of PMI illustrated in FIGS. 10 and 11. When two pieces of PMI have a parent-child relationship, information indicating the parent-child relationship is given to both the pieces of PMI in FIG. 12. The information indicating the parent-child relationship, however, may be given to only one of the pieces of PMI, instead.

When information indicating parent-child relationships between pieces of PMI is added to three-dimensional model data and held, too, the information may be held separately from the pieces of PMI. Alternatively, information indicating parent-child relationships between pieces of PMI may be managed separately from three-dimensional model data as a definition file indicating the parent-child relationships between the pieces of PMI.

Although a plurality of pieces of PMI are detected from three-dimensional model data and relationships between the plurality of pieces of PMI are determined in the above description, a plurality of pieces of PMI may be detected from general-purpose two-dimensional drawing data such as DXF data and relationships between the plurality of pieces of PMI may be determined, instead.

Figure 13:
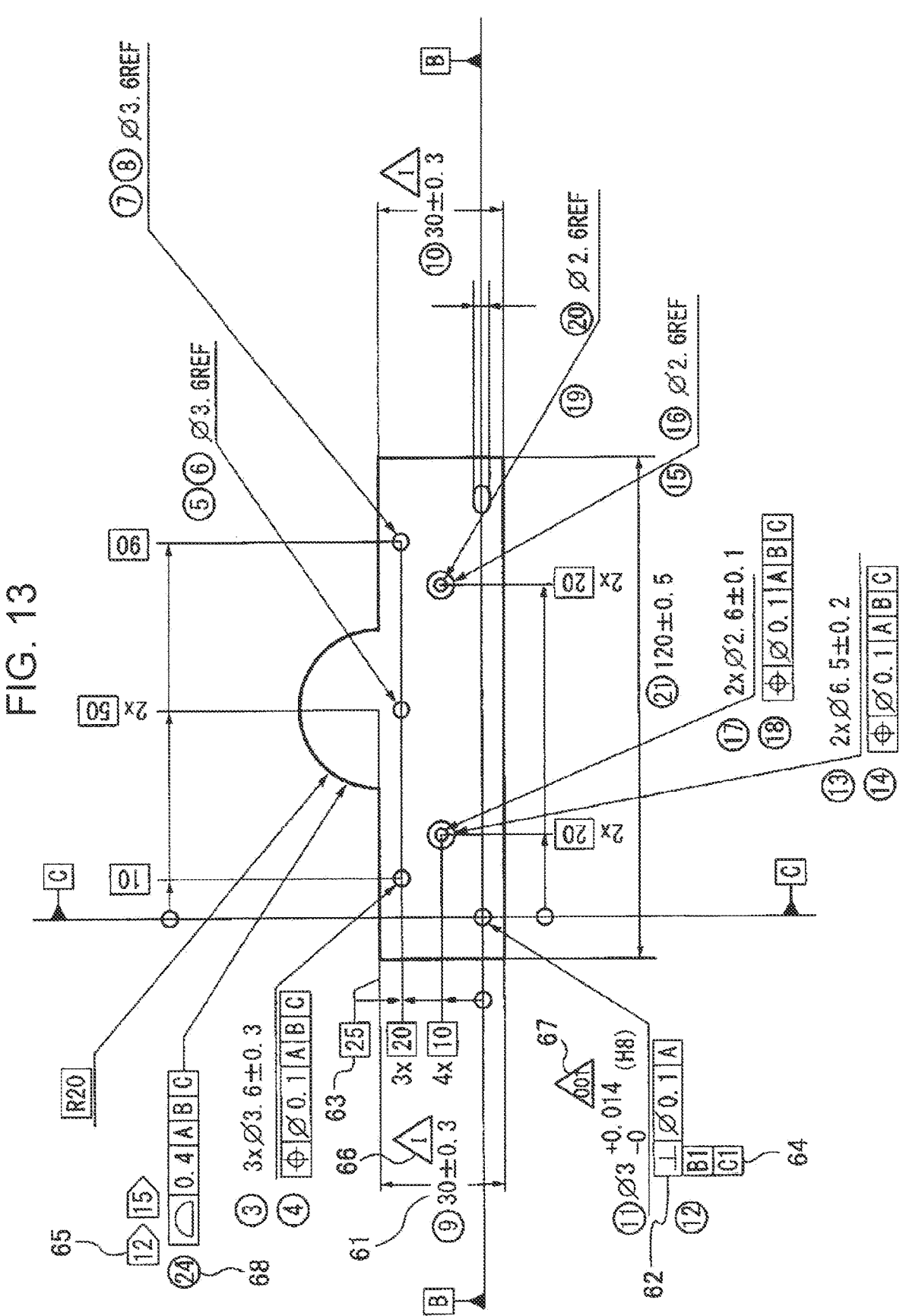
FIG. 13 is a diagram illustrating an example of a two-dimensional drawing based on drawing exchange format (DXF) data.

FIG. 13 illustrates an example of a two-dimensional drawing based on such DXF data.

The two-dimensional drawing illustrated in FIG. 13 includes pieces of PMI that define a size tolerance 61, a geometric tolerance 62, a TED 63, a datum target 64, a note flag 65, a caliper instruction 66, a design change symbol 67, and a balloon symbol 68, respectively. FIG. 14 illustrates a list of types of the pieces of PMI included in the DXF data regarding the two-dimensional drawing illustrated in FIG. 13.

In FIG. 14, the size tolerance 61 specify dimensions and tolerances such as length, angle, or diameter and entity types thereof in DXF data are "dimension". Here, an entity refers to each of symbols, such as a geometric tolerance and a size tolerance, expressed by the pieces of PMI in DXF data.

In FIG. 14, types of pieces of PMI, meanings, features, and entity types of the geometric tolerance 62, the TED 63, the datum target 64, the note flag 65, the caliper instruction 66, the design change symbol 67, and the balloon symbol 68 are also specified.

Figure 15A:
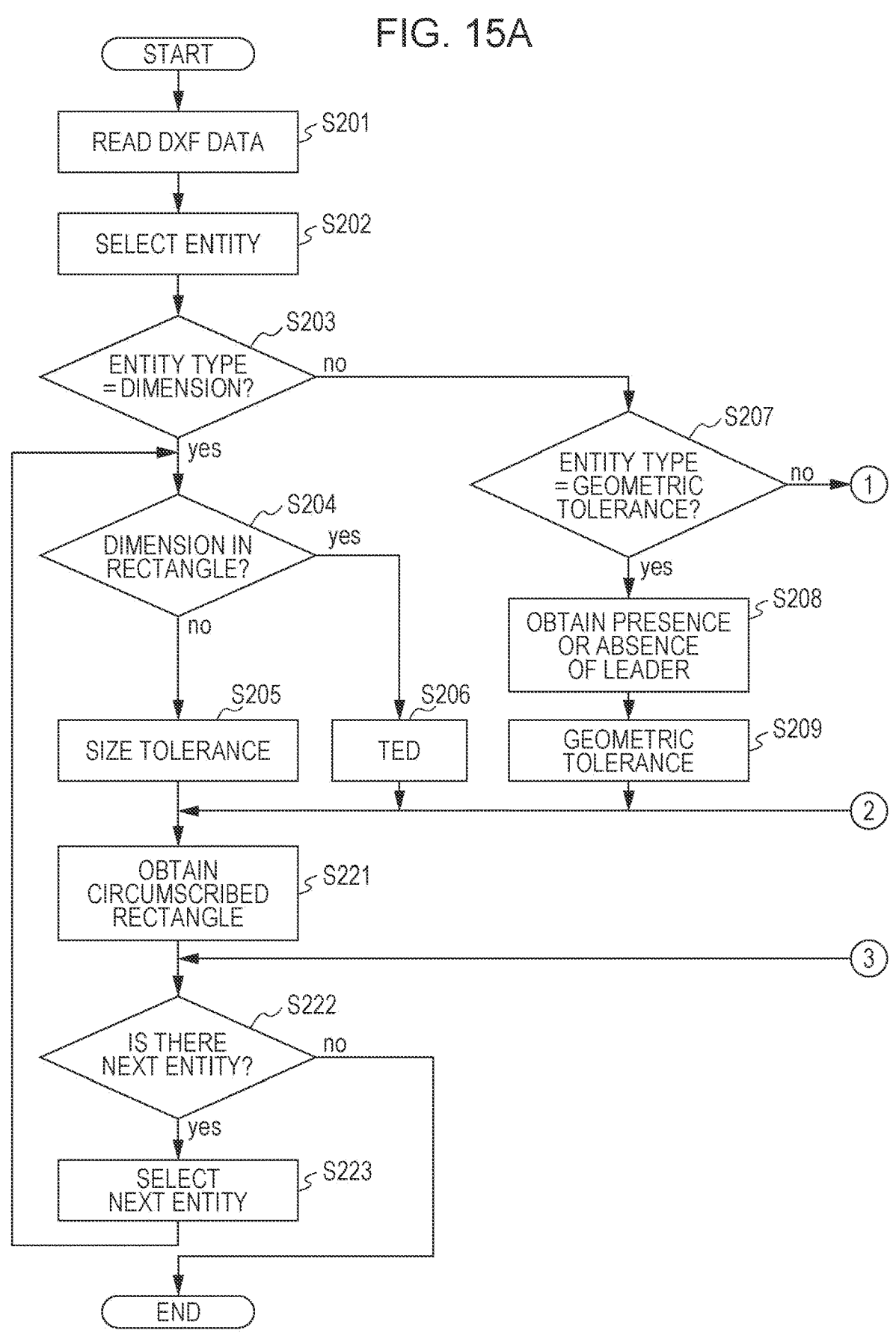
FIGS. 15A and 15B are flowcharts illustrating a method for detecting pieces of PMI from DXF data.
Figure 15B:
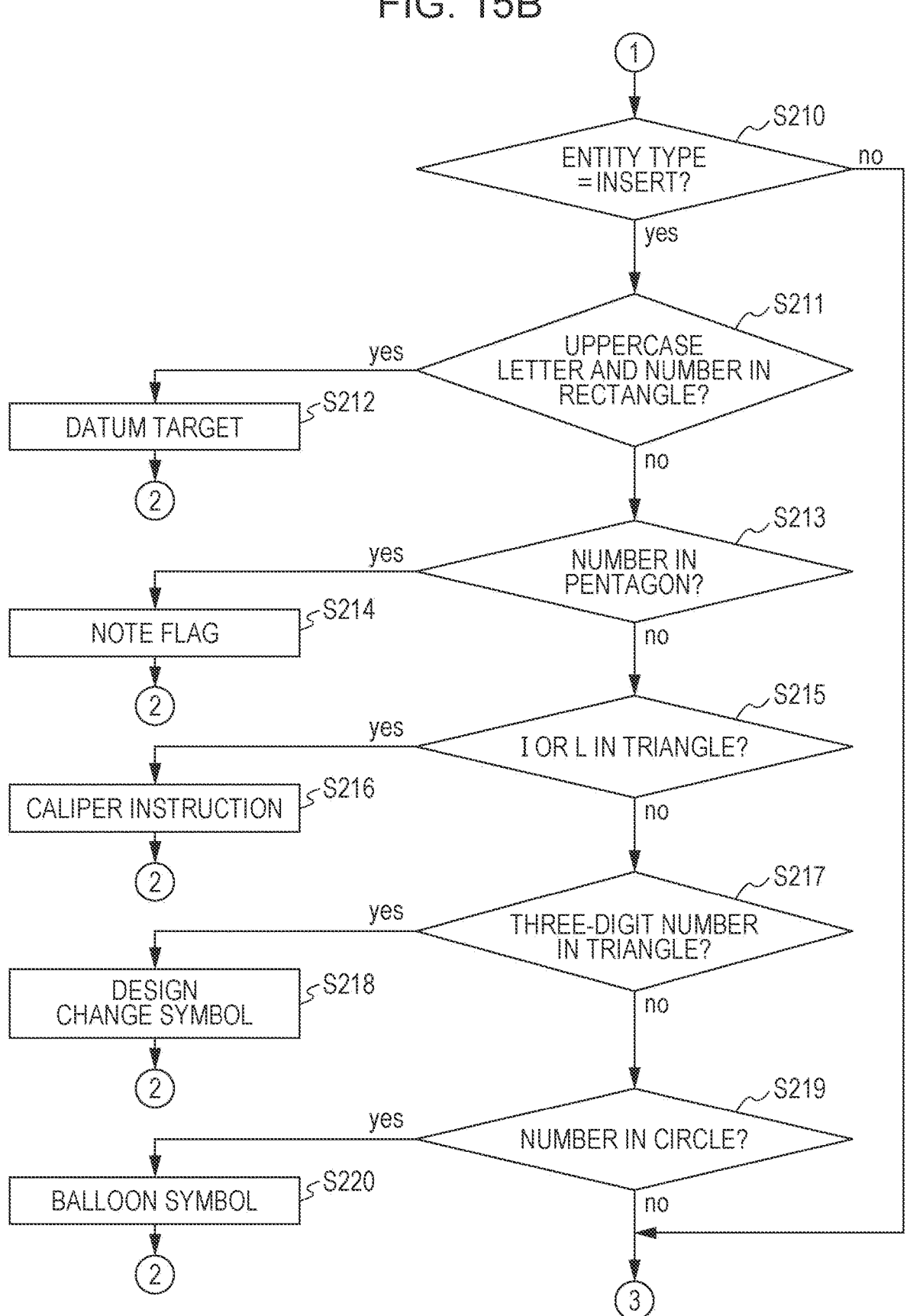

Next, a method for detecting such pieces of PMI from DXF data will be described with reference to a flowchart of FIGS. 15A and 15B.

First, the control unit 34 reads DXF data stored in the data storage unit 35 in step S201 and selects an entity in step S202.

Next, in step S203, the control unit 34 determines whether an entity type of the selected entity is "dimension". If determining in step S203 that the entity type of the selected entity is "dimension", the control unit 34 determines, in step S204, whether a symbol for the entity is a dimension in a rectangle.

If determining in step S204 that the symbol for the entity is not a dimension in a rectangle, the control unit 34 determines, in step S205, that a piece of PMI expressed by the selected entity is a size tolerance. If determining in step S204 that the symbol for the entity is a dimension in a rectangle, the control unit 34 determines, in step S206, that the piece of PMI expressed by the selected entity is a TED.

If determining in step S203 that the entity type of the selected entity is not "dimension", the control unit 34 determines, in step S207, whether the entity type of the selected entity is "geometric tolerance".

If determining in step S207 that the entity type of the selected entity is "geometric tolerance", the control unit 34 obtains, in step S208, information indicating presence or absence of a leader for the entity and determines, in step S209, that the piece of PMI expressed by the selected entity is a geometric tolerance.

If determining in step S207 that the entity type of the selected entity is not "geometric tolerance", the control unit 34 determines, in step S210, whether the entity type of the selected entity is "insertion".

If determining in step S210 that the entity type of the selected entity is "insertion", the control unit 34 determines, in step S211, whether the symbol for the entity is an uppercase letter and a number, which together indicate a datum, in a rectangle.

If determining in step S211 that the symbol for the entity is an uppercase letter and a number in a rectangle, the control unit 34 determines, in step S212, that the piece of PMI expressed by the selected entity is a datum target.

If determining in step S211 that the symbol for the entity is not an uppercase letter and a number in a rectangle, the control unit 34 determines, in step S213, whether the symbol for the entity is a number in a pentagon.

If determining in step S213 that the symbol for the entity is a number in a pentagon, the control unit 34 determines, in step S214, determines that the piece of PMI expressed by the selected entity is a note flag.

If determining in step S213 that the symbol for the entity is not a number in a pentagon, the control unit 34 determines, in step S215, whether the symbol for the entity is "I" or "L" in a triangle.

If determining in step S215 that the symbol for the entity is "I" or "L" in a triangle, the control unit 34 determines, in step S216, that the piece of PMI expressed by the selected entity is a caliper instruction.

If determining in step S215 that the symbol for the entity is not "I" or "L" in a triangle, the control unit 34 determines, in step S217, whether the symbol for the entity is a three-digit number in a triangle.

If determining in step S217 that the symbol for the entity is a three-digit number in a triangle, the control unit 34 determines, in step S218, that the piece of PMI expressed by the selected entity is a design change symbol.

If determining in step S217 that the symbol for the entity is not a three-digit number in a triangle, the control unit 34 determines, in step S219, whether the symbol for the entity is a number in a circle.

If determining in step S219 that the symbol for the entity is a number in a circle, the control unit 34 determines, in step S220, that the piece of PMI expressed by the selected entity is a balloon symbol.

After identifying a type of PMI expressed by the selected entity in step S205, S206, S209, S212, S214, S216, S218, or S220, the control unit 34 obtains, in step S221, information regarding a circumscribed rectangle of the piece of PMI whose type has been identified.

The control unit 34 then determines, in step S222, whether there is a next entity in the DXF data. If determining in step S219 that the symbol for the entity is not a number in a circle or determining in step S210 that the entity type of the selected entity is not "insertion", too, the control unit 34 determines, in step S222, whether there is a next entity in the DXF data.

If determining in step S222 that there is a next entity in the DXF data, the control unit 34 selects the next entity in step S223 and returns to step S204. If determining in step S222 that there is no next entity in the DXF data, the control unit 34 ends the process.

Figure 16:
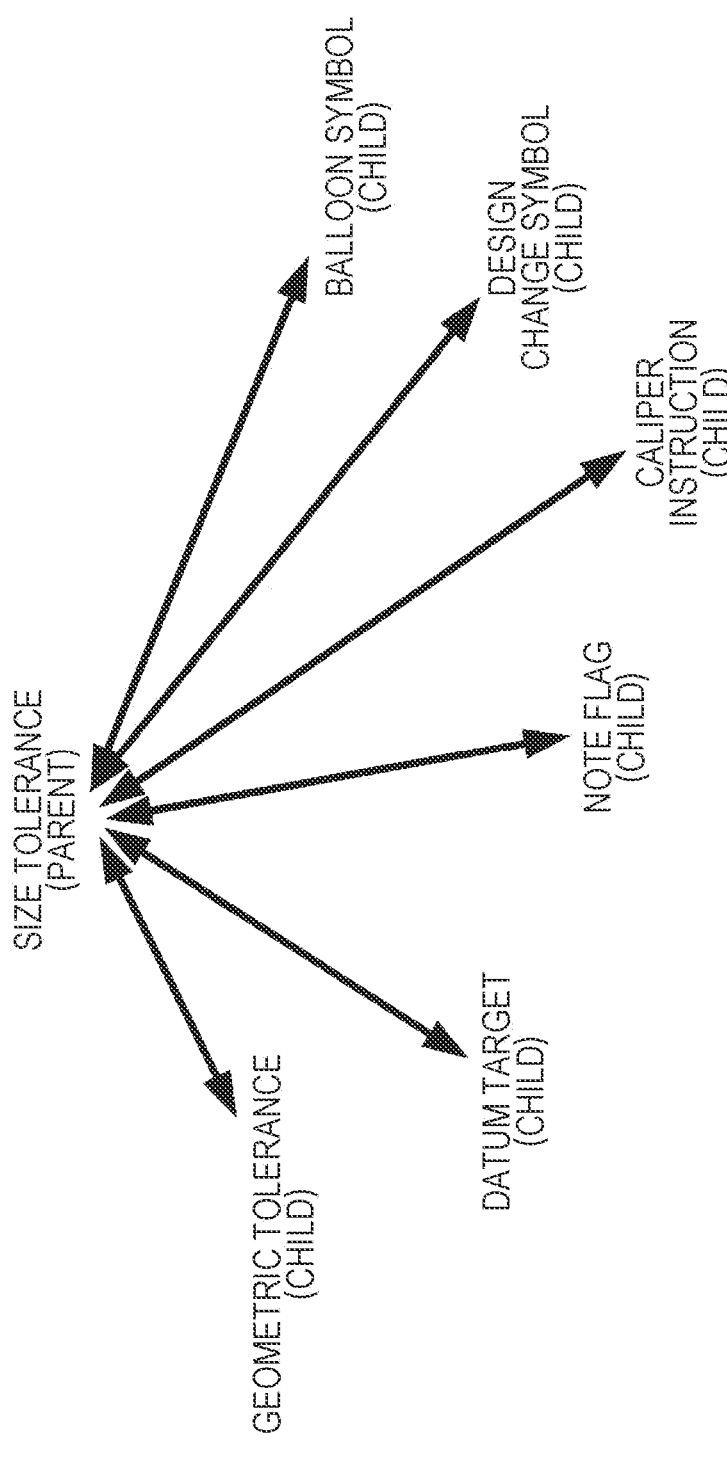
FIG. 16 is a diagram illustrating a specific example where relationships between a plurality of pieces of PMI detected from DXF data are determined on the basis of the plurality of pieces of PMI.
Figures 17A, 17B:
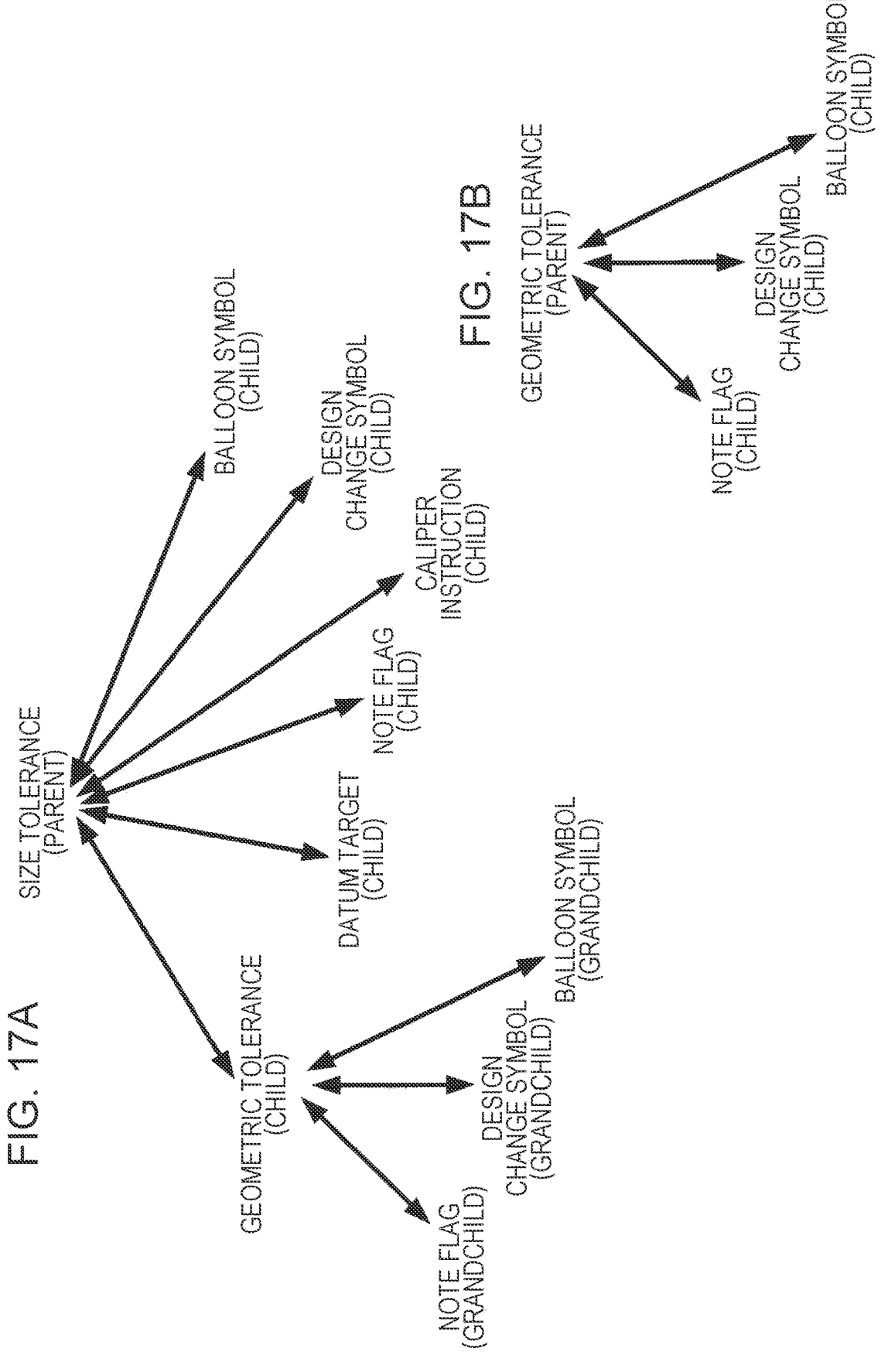
FIGS. 17A and 17B are diagrams illustrating specific examples where relationships between a plurality of pieces of PMI detected from DXF data are determined on the basis of the plurality of pieces of PMI.

Next, the control unit 34 determines relationships between a plurality of pieces of PMI detected from DXF data on the basis of the plurality of pieces of PMI. FIGS. 16 to 17B illustrate specific examples of types of relationship.

As illustrated in FIG. 16, for example, the control unit 34 determines, as pattern 1, that there are parent-child relationships where a piece of PMI whose type is a size tolerance is a parent and pieces of PMI whose types are a geometric tolerance, a datum target, a note flag, a caliper instruction, a design change symbol, and a balloon symbol, respectively, are children.

Alternatively, as illustrated in FIG. 17A, for example, the control unit 34 determines, as pattern 2, that there are parent-child relationships where a piece of PMI whose type is a size tolerance is a parent, pieces of PMI whose types are a geometric tolerance, a datum target, a note flag, a caliper instruction, a design change symbol, and a balloon symbol, respectively, are children, and pieces of PMI whose types are a note flag, a design change symbol, and a balloon symbol, respectively, are grandchildren. In FIG. 17A, the note flag, the design change symbol, and the balloon symbol that are grandchildren of the size tolerance are children of the geometric tolerance.

Alternatively, as illustrated in FIG. 17B, the control unit 34 may determine, as pattern 3, that there are only parent-child relationships where the piece of PMI whose type is a geometric tolerance is a parent and the pieces of PMI whose types are a note flag, a design change symbol, and a balloon symbol, respectively, are children.

Figure 18A:
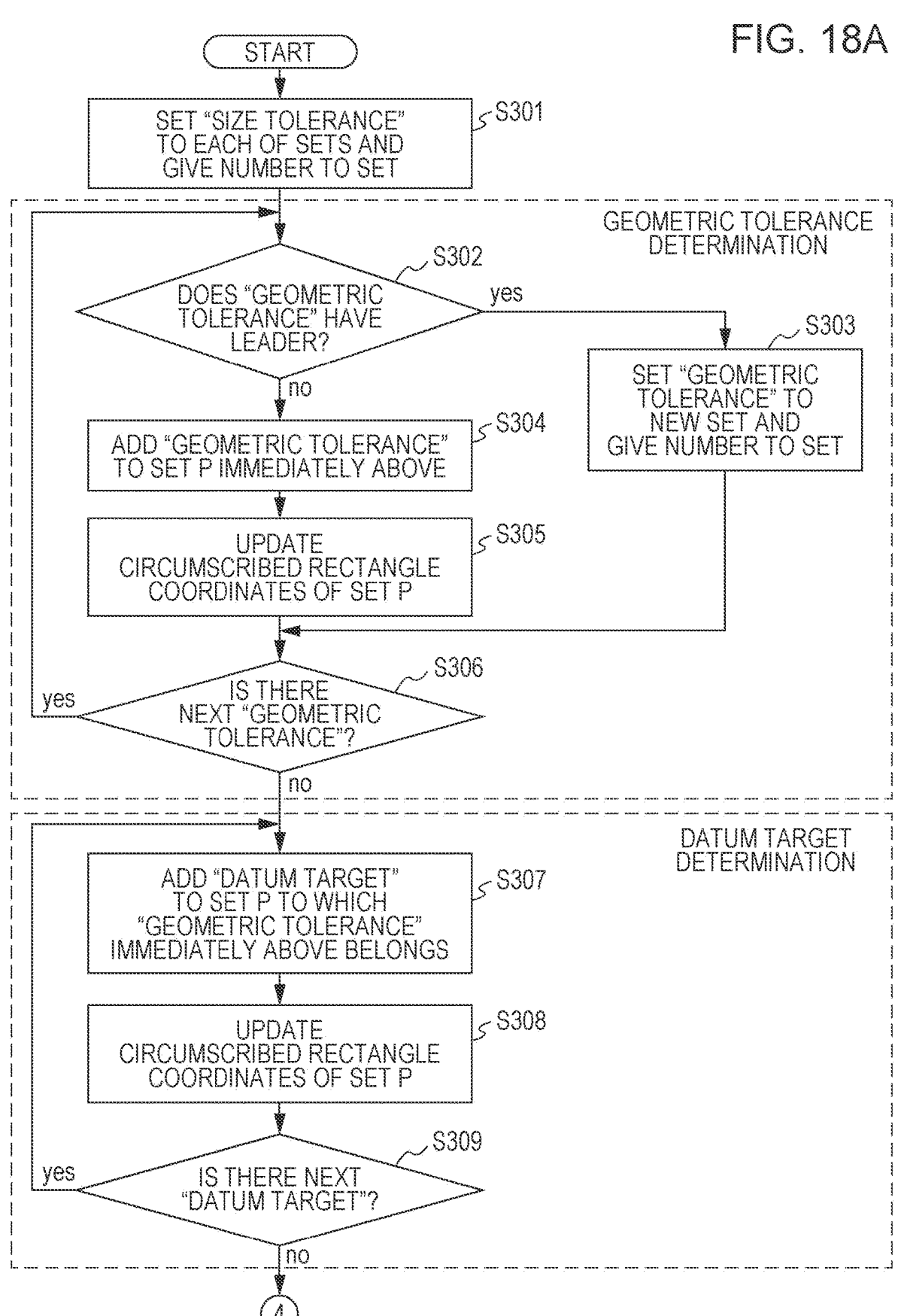
FIGS. 18A and 18B are flowcharts illustrating a method for determining a relationship as in FIGS. 16 and 17.
Figure 18B:
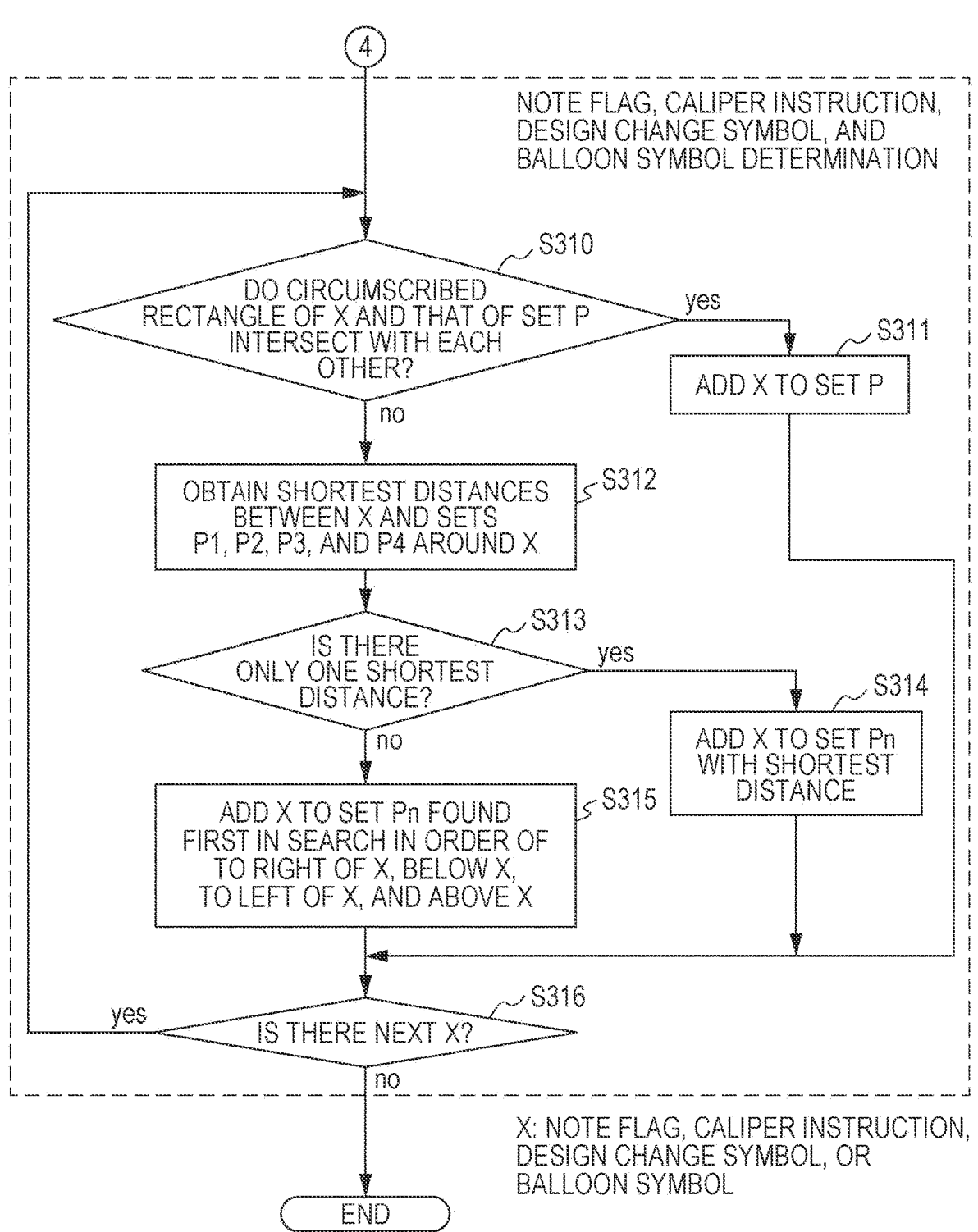

Next, an example of a method for determining a relationship as in FIGS. 16 and 17 will be described with reference to flowcharts of FIGS. 18A and 18B.

First, in step S301, the control unit 34 sets a piece of PMI whose type is a size tolerance in each of sets and gives a number to the set. Here, a set refers to a plurality of pieces of PMI having the parent-child relationships in one of the patterns illustrated in FIGS. 16 and 17.

Next, the control unit 34 makes a determination as to a geometric tolerance through steps S302 to S306. More specifically, in step S302, the control unit 34 selects, in DXF data, one of pieces of PMI whose types are a geometric tolerance and determines whether the piece of PMI whose type is a geometric tolerance has a leader. If determining in step S302 that the piece of PMI whose type is a geometric tolerance has a leader, the control unit 34 sets, in step S303, the piece of PMI whose type is a geometric tolerance to a new set and gives a number to the new set.

If determining in step S302 that the piece of PMI whose type is a geometric tolerance does not have a leader, the control unit 34 adds, in step S304, the piece of PMI whose type is a geometric tolerance to a set P immediately above. "Immediately above" refers to a position right above in the DXF data. In step S305, the control unit 34 updates circumscribed rectangle coordinates of the set P to which the piece of PMI whose type is a geometric tolerance has been added.

In step S306, the control unit 34 determines whether there is a next piece of PMI whose type is a geometric tolerance in the DXF data. The control unit 34 repeats steps S302 to S305 until there is no longer a piece of PMI whose type is a geometric tolerance and that has not been subjected to the determination.

Next, the control unit 34 makes a determination as to a datum target through steps S307 to S309. More specifically, the control unit 34 selects, in step S307, one of pieces of PMI whose types are a datum target in the DXF data and adds the selected piece of PMI whose type is a datum target to a set P to which a piece of PMI whose type is a geometric tolerance belongs, the piece of PMI whose type is a geometric tolerance being located immediately above the piece of PMI whose type is a datum target. In step S308, the control unit 34 updates circumscribed rectangle coordinates of the set P to which the piece of PMI whose type is a datum target has been added.

In step S309, the control unit 34 determines whether there is a next piece of PMI whose type is a datum target in the DXF data. The control unit 34 repeats steps S307 and S308 until there is no longer a piece of PMI whose type is a datum target and that has not been subjected to the determination.

Next, the control unit 34 makes determinations as to a note flag, a caliper instruction, a design change symbol, and a balloon symbol through step S310 to S316. In the flowchart of FIG. 18B, a piece of PMI whose type is a note flag, a caliper instruction, a design change symbol, or a balloon symbol is denoted by "X".

In step S310, the control unit 34 selects, in the DXF data, one of pieces of PMI whose type is a note flag, a caliper instruction, a design change symbol, or a balloon symbol and determines whether a circumscribed rectangle of the piece of PMI and the circumscribed rectangle of the set P intersect with each other. If determining in step S310 that the circumscribed rectangle of the piece of PMI whose type is a note flag, a caliper instruction, a design change symbol, or a balloon symbol and the circumscribed rectangle of the set P intersect with each other, the control unit 34 adds, in step S311, the piece of PMI to the set P.

If determining in step S310 that the circumscribed rectangle of the piece of PMI whose type is a note flag, a caliper instruction, a design change symbol, or a balloon symbol and the circumscribed rectangle of the set P do not intersect with each other, the control unit 34 obtains, in step S312, shortest distances between the piece of PMI whose type is a note flag, a caliper instruction, a design change symbol, or a balloon symbol and sets P1, P2, P3, and P4 located around the piece of PMI.

In step S313, the control unit 34 determines whether only one shortest distance has been obtained. If determining in step S313 that only one shortest distance has been obtained, the control unit 34 adds, in step S314, the piece of PMI to a set P with the shortest distance.

If determining in step S313 that two or more shortest distances have been obtained, the control unit 34 adds, in step S315, the piece of PMI to a set P found first in a search made in order of to the right of, below, to the left of, and above the piece of PMI.

After adding the piece of PMI whose type is a note flag, a caliper instruction, a design change symbol, or a balloon symbol to the set P in step S311, S314, or S315, the control unit 34 determines, in step S316, whether there is a next piece of PMI whose type is a note flag, a caliper instruction, a design change symbol, or a balloon symbol in the DXF data. The control unit 34 repeats steps S310 to S315 until there is no longer a piece of PMI whose type is a note flag, a caliper instruction, a design change symbol, or a balloon symbol and that has not been subjected to the determination.

As a result of the above process, the pieces of PMI included in the DXF data are set as a set of a plurality of pieces of PMI in one of the patterns illustrated in FIGS. 16 and 17.

Next, a method for displaying three-dimensional model data using relationships between a plurality of pieces of PMI determined by the method described above will be described.

Figure 19:
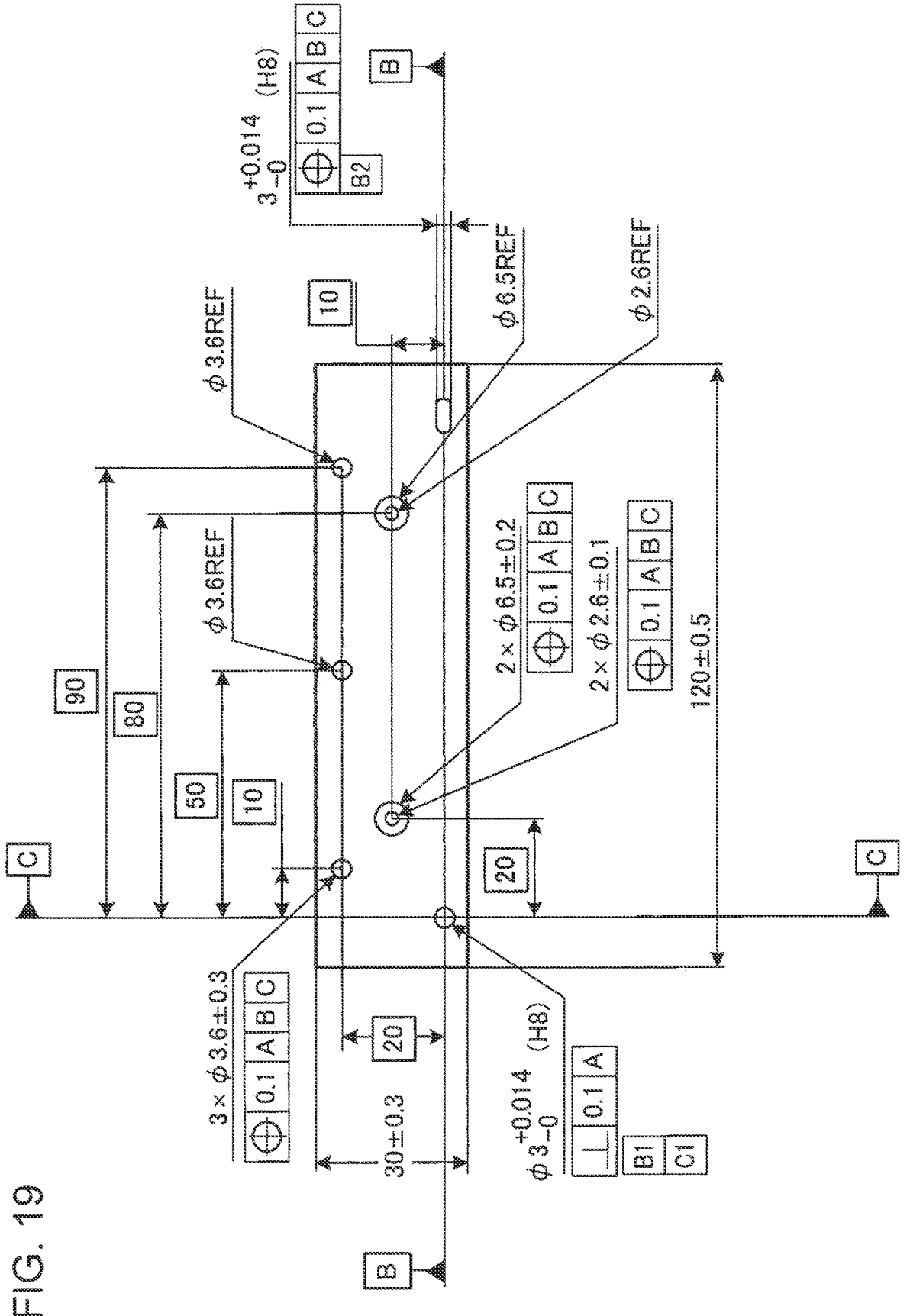
FIG. 19 is a diagram illustrating an example of drawing data regarding a part having a certain shape.

A case where drawing data regarding a part having a shape illustrated in FIG. 19 is displayed in three dimensions will be described hereinafter.

Although parent-child relationships between a plurality of pieces of PMI are determined and information indicating the parent-child relationships is generated in the above description, the control unit 34 also determines relationships where a plurality of pieces of PMI belong to the same group and relationships where a plurality of pieces of PMI belong to the same set and generates information indicating these relationships.

For example, the control unit 34 determines that at least two pieces of PMI in which defined geometric tolerances or size tolerances indicate forms of the same type have a correspondence and belong to the same group, and generates information indicating that the at least two pieces of PMI belong to the same group. More specifically, pieces of PMI that define specifications of a plurality of holes, a plurality of protrusions, or the like having the same shape and the same specifications are determined to belong to the same group.

In addition, the control unit 34 determines that at least two pieces of PMI in which defined geometric tolerances or size tolerances indicate the same form have a correspondence and belong to the same set, and generates information indicating that the at least two pieces of PMI belong to the same set. More specifically, pieces of PMI that define specifications of the same form, such as an inner diameter and an outer diameter of a form having the same central axis or height and width of a form, are determined to belong to the same set.

A method for using displayed three-dimensional model data after such relationships are determined will be described hereinafter.

Figure 20:
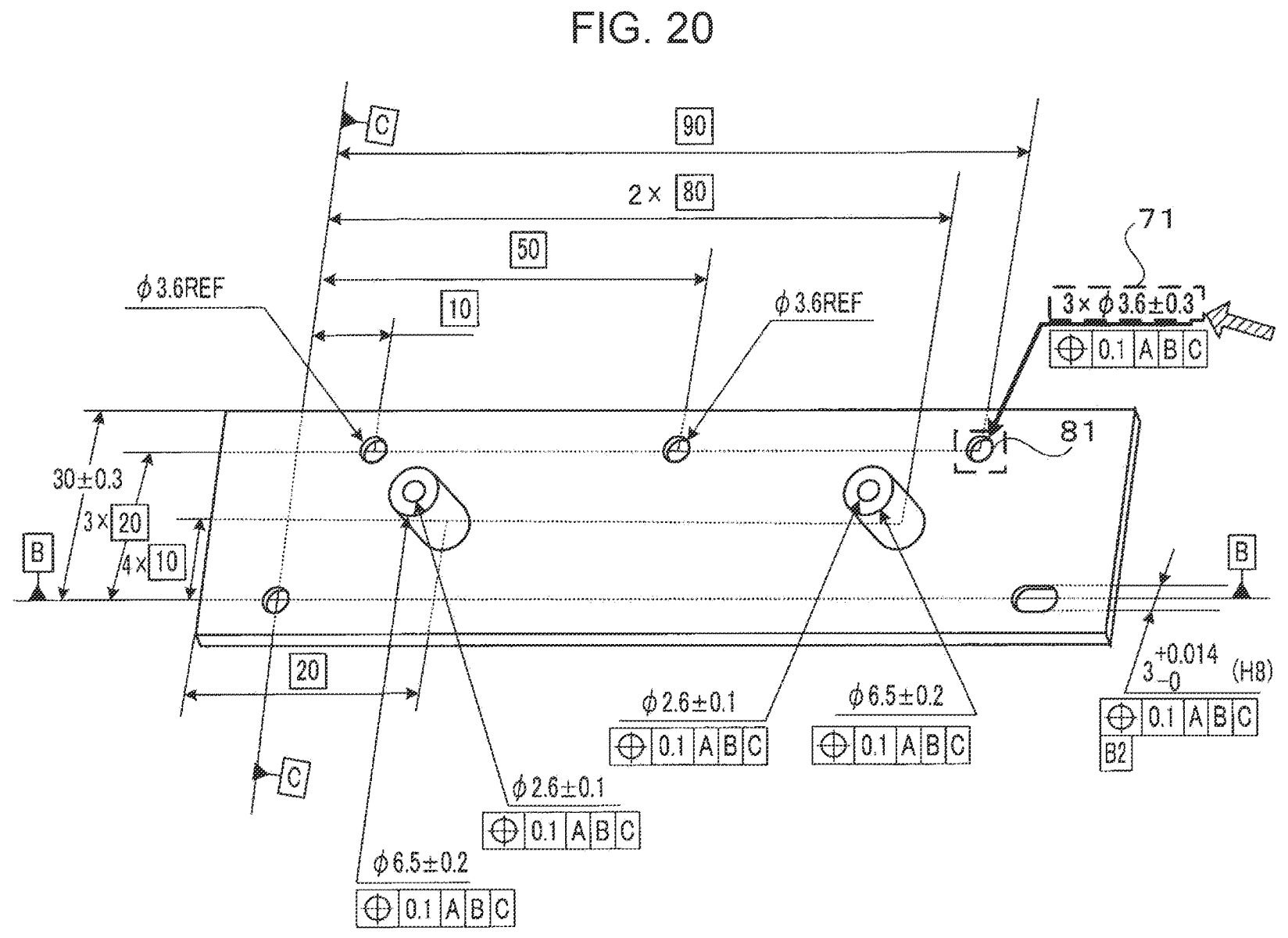

First, FIG. 20 illustrates an example of display where the drawing data illustrated in FIG. 19 has been displayed in three dimensions and a displayed size tolerance 71 has been clicked. FIG. 20 illustrates a case where the size tolerance 71, "3×Ø3.6±0.3", indicating a diameter of a rightmost one of three round holes having the same shape and the same specifications has been clicked. Here, "3×" means that there are three parts having the same specifications. "REF" is given to size tolerances of the other holes to indicate that the other holes have the same specifications. In Japanese Industrial Standards (JIS), parentheses are used after a dimension or the like, such as "(R10)", instead of using the word "REF".

In FIG. 20, the size tolerance 71 and a shape of a hole 81 indicated by the size tolerance 71 are highlighted by clicking the size tolerance 71. The size tolerance 71 and the shape of the hole 81 may be highlighted using a color different from one used for other elements, for example, but in FIG. 20, the use of a different color is expressed by dashed bold lines surrounding the size tolerance 71 and the shape of the hole 81.

Figure 21:
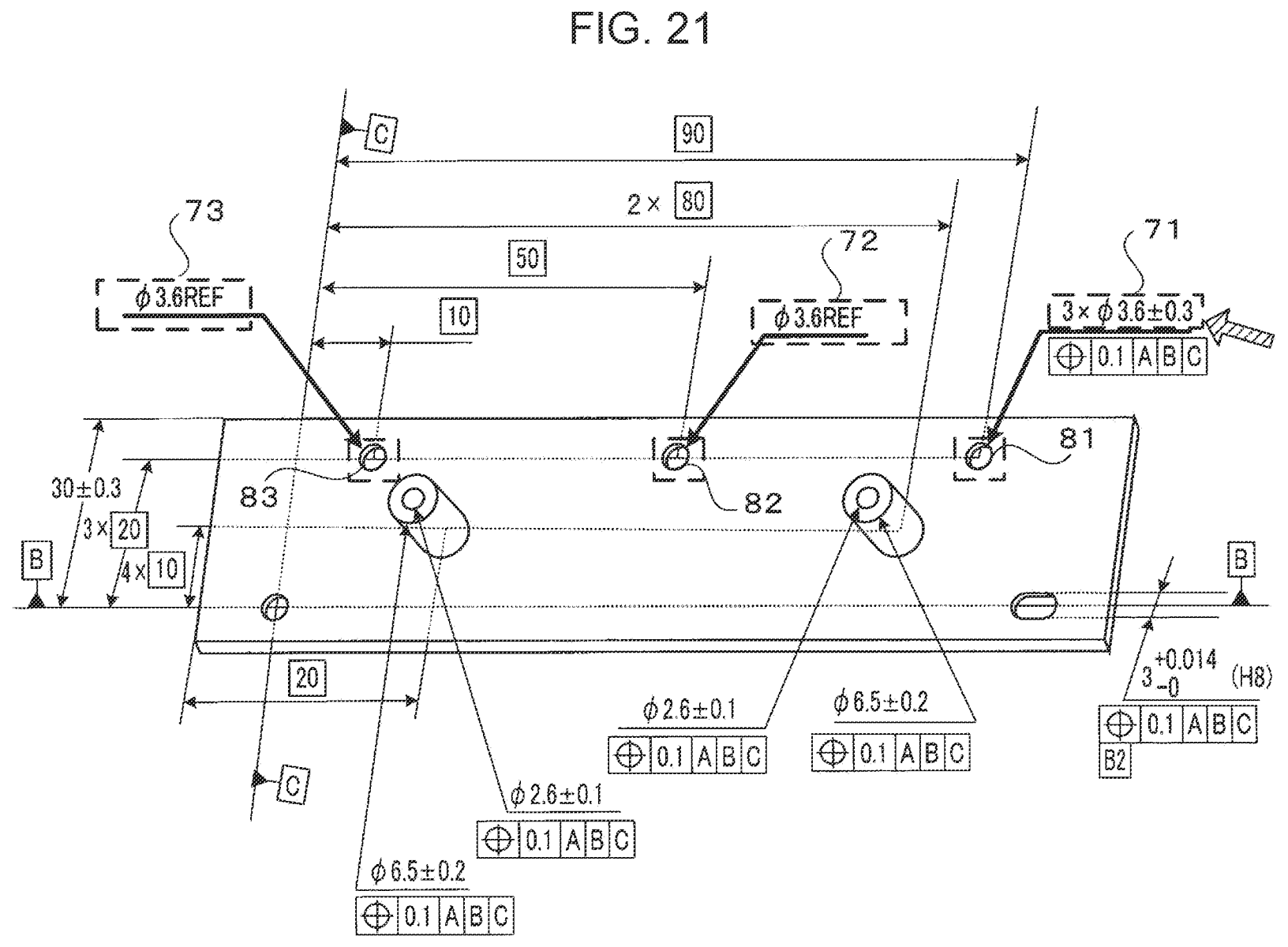

FIG. 21 illustrates an example of display where the size tolerance 71 has been double-clicked in the display state illustrated in FIG. 20. In FIG. 21, not only the size tolerance 71 but also holes 82 and 83 other than the hole 81 having the same shapes and the same specifications and size tolerances 72 and 73 indicating dimensions of the holes 82 and 83 are highlighted.

Since it has been determined that the size tolerances 71 to 73, which define the specifications of the holes 81 to 83, respectively, belong to the same group, the size tolerances 72 and 73 and the holes 82 and 83 can be highlighted just by double-clicking the size tolerance 71 in the example illustrated in FIG. 21.

Figure 22:
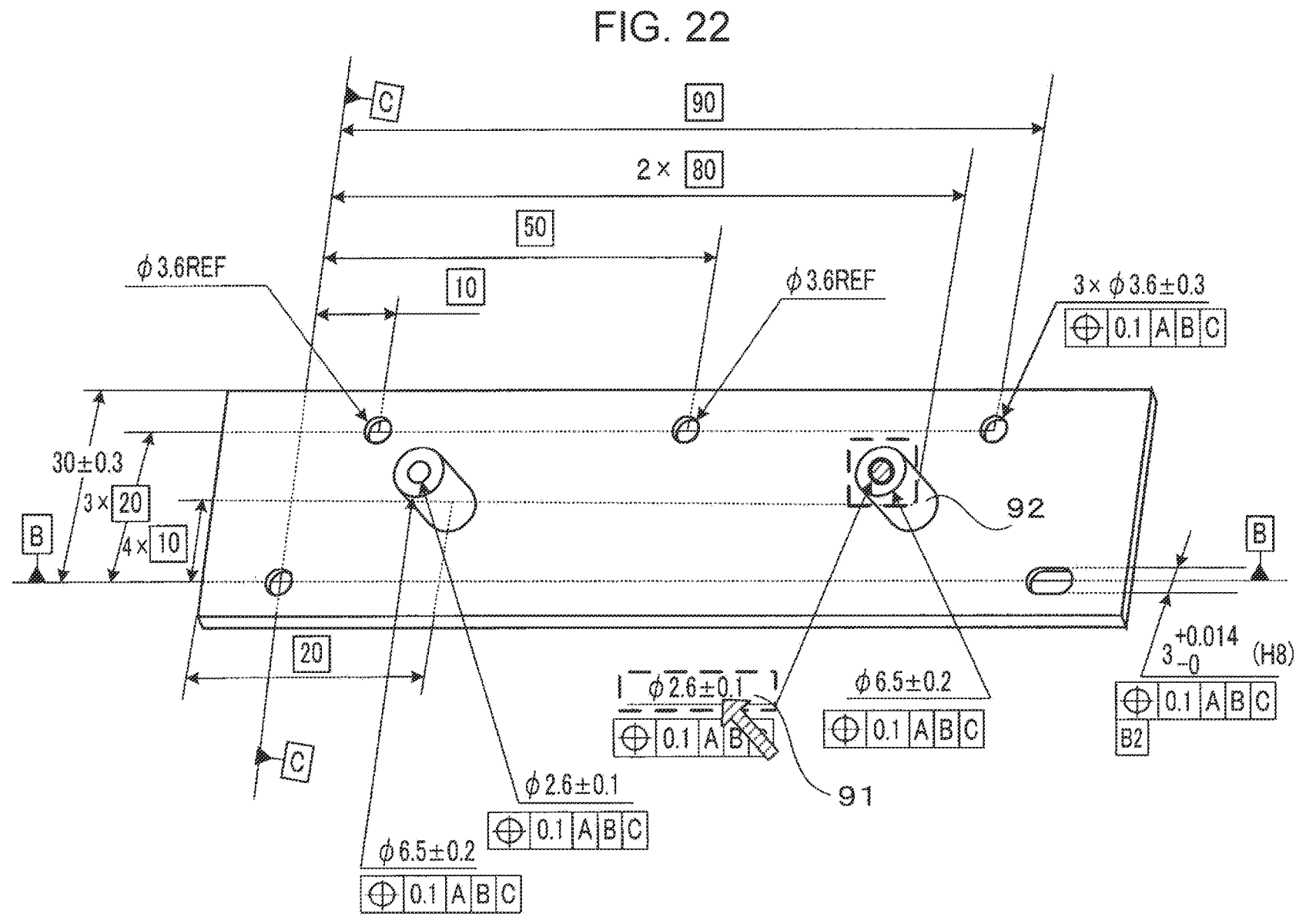

FIG. 22 illustrates an example of display where the drawing data illustrated in FIG. 19 has been displayed in three dimensions and a displayed size tolerance 91 has been clicked. FIG. 22 illustrates a case where the size tolerance 91, "Ø2.6±0.1", indicating an inner diameter of a right one of two cylindrical bosses having an inner diameter of 2.6 mm and an outer diameter of 6.5 mm has been clicked.

In FIG. 22, the size tolerance 91 and a part corresponding to the inner diameter of a cylindrical boss 92 indicated by the size tolerance 91 are highlighted by clicking the size tolerance 91.

Figure 23:
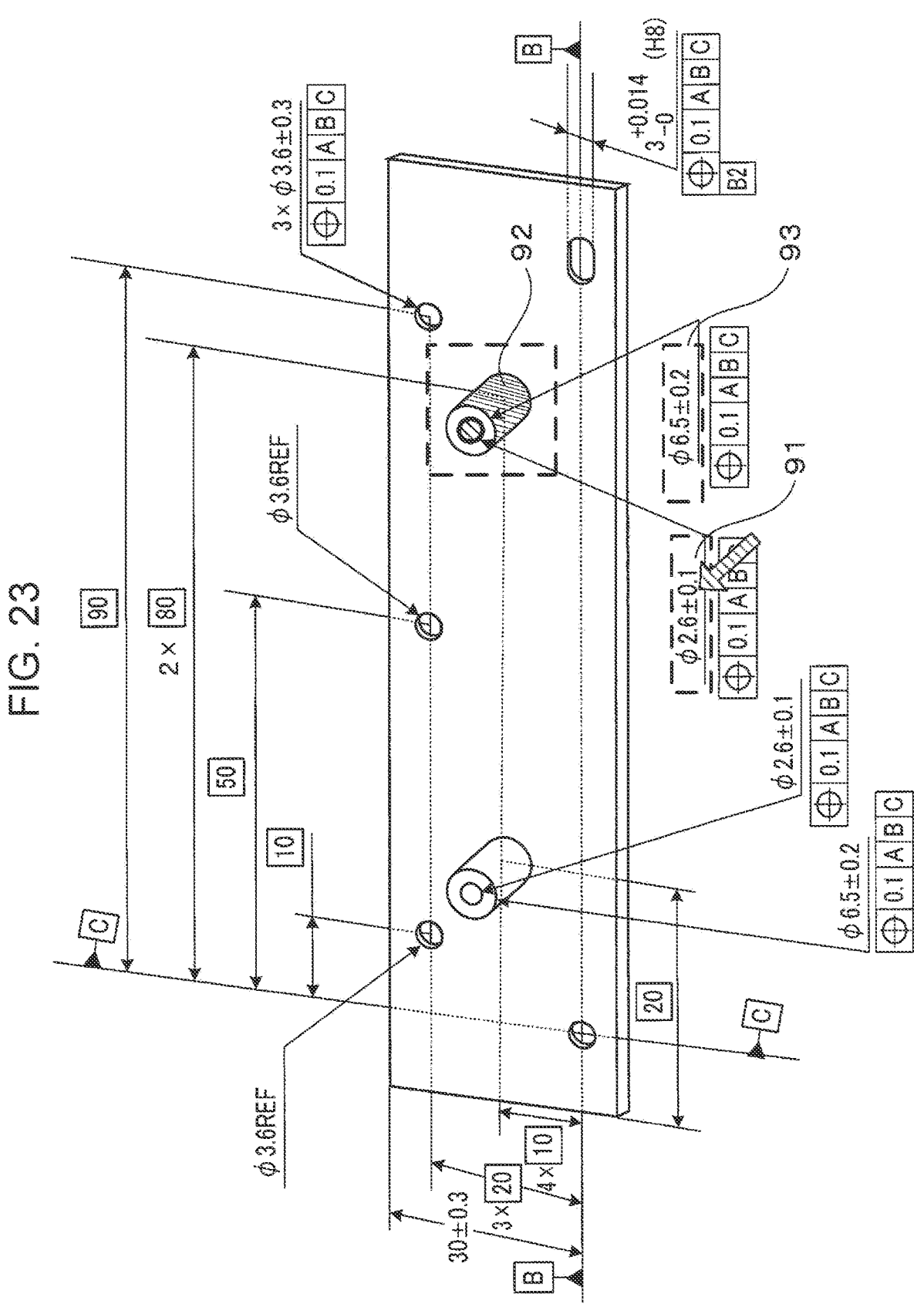
FIG. 23 is a diagram illustrating an example of display where the other size tolerance has been double-clicked.

FIG. 23 illustrates an example of display where the size tolerance 91 has been double-clicked in the display state illustrated in FIG. 22. In FIG. 23, not only the size tolerance 91 but also a size tolerance 93 indicating an outer diameter of the cylindrical boss 92 having the same central axis and a part corresponding to the outer diameter of the cylindrical boss 92 are highlighted.

Figure 24:
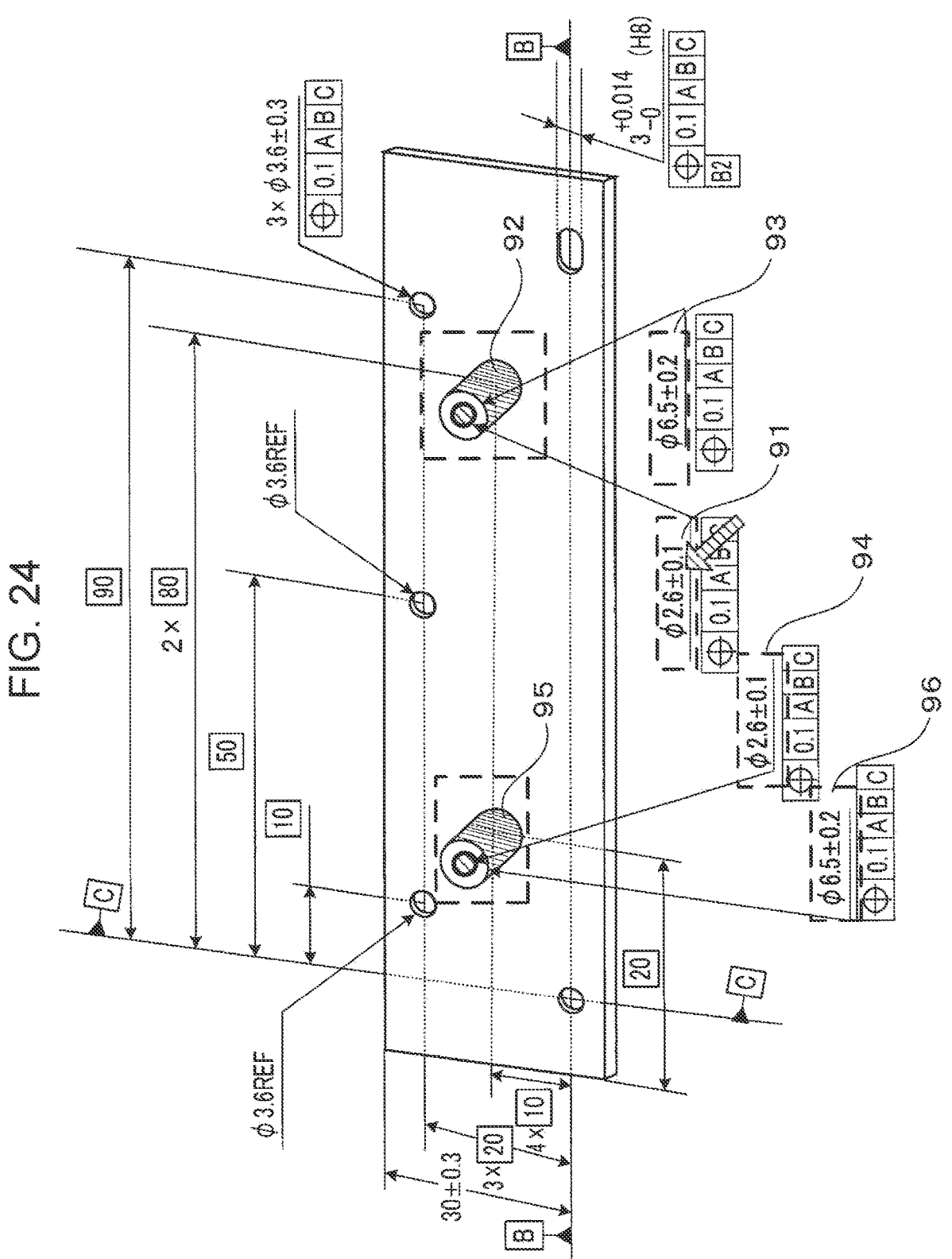
FIG. 24 is a diagram illustrating an example of display where the other size tolerance has been triple-clicked.

FIG. 24 illustrates an example of display where the size tolerance 91 has been triple-clicked in the display state illustrated in FIG. 23. In FIG. 24, not only the size tolerances 91 and 93 but also size tolerances 94 and 96 indicating dimensions of an inner diameter and an outer diameter, respectively, of a cylindrical boss 95 having the same shape and the same specifications as the cylindrical boss 92 and parts corresponding to the inner diameter and the outer diameter of the cylindrical boss 95 are highlighted. The double-click and the triple-click are examples, and it is needless to say that another method, such as a click with a key pressed or a click with a mode selected, may be used, instead.

In FIGS. 20 to 24, all pieces of PMI are displayed on a three-dimensional model, and pieces of PMI having a certain relationship with a clicked piece of PMI are highlighted. When one of a plurality of pieces of PMI included in three-dimensional model data is selected, however, only pieces of PMI having a certain relationship with the selected piece of PMI may be displayed through filtering, instead.

Figure 25:
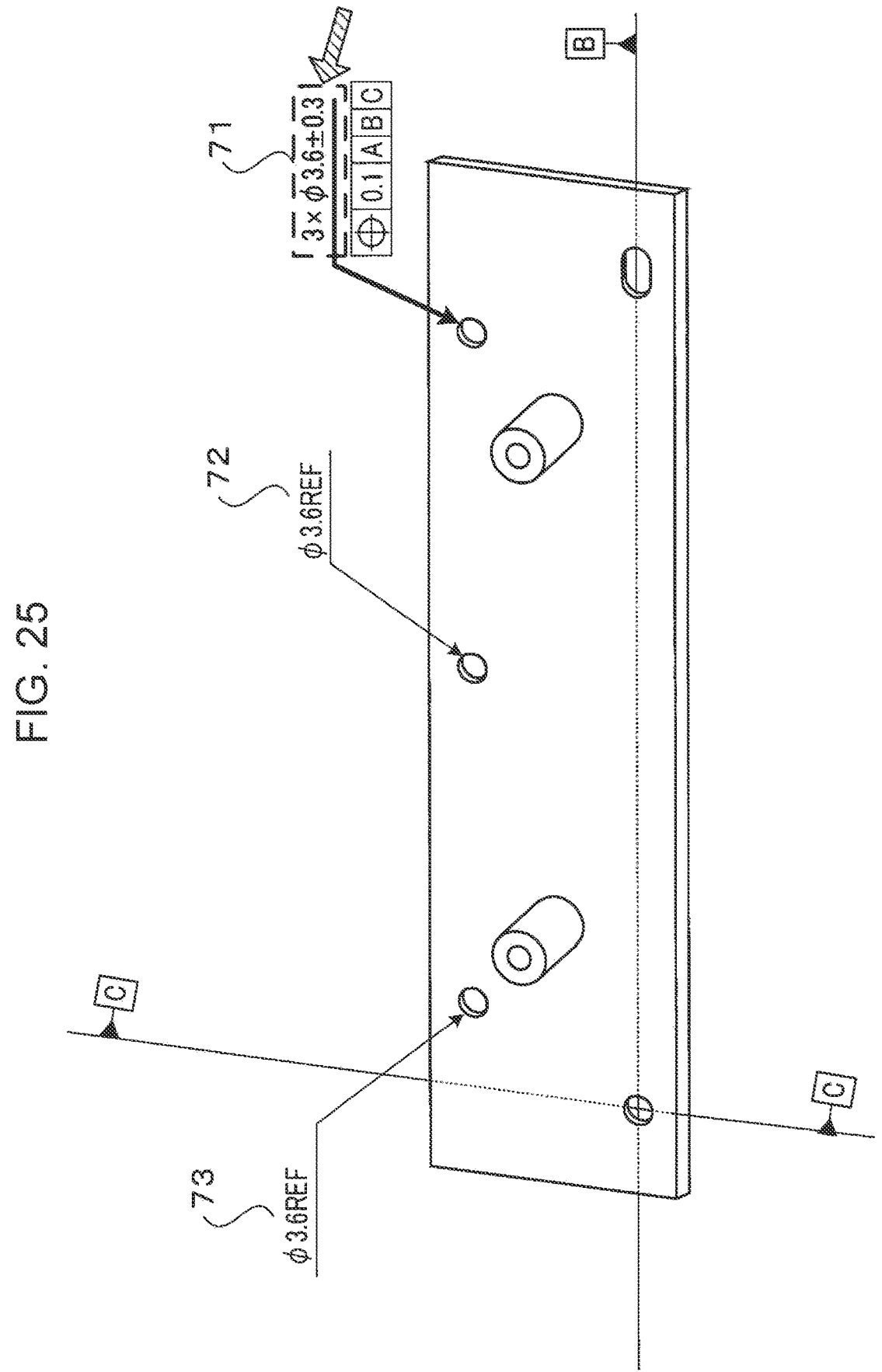
FIG. 25 is a diagram illustrating an example where the size tolerance has been selected and only pieces of PMI belonging to the same group as the selected size tolerance are displayed through filtering.

For example, FIG. 25 illustrates an example where the size tolerance 71 has been selected and only pieces of PMI belonging to the same group as the selected size tolerance 71 are displayed through filtering.

In FIG. 25, since the size tolerance 71 has been selected, only the size tolerances 72 and 73 belonging to the same group as the selected size tolerance 71 are displayed, and other pieces of PMI are not displayed.

Figure 26:
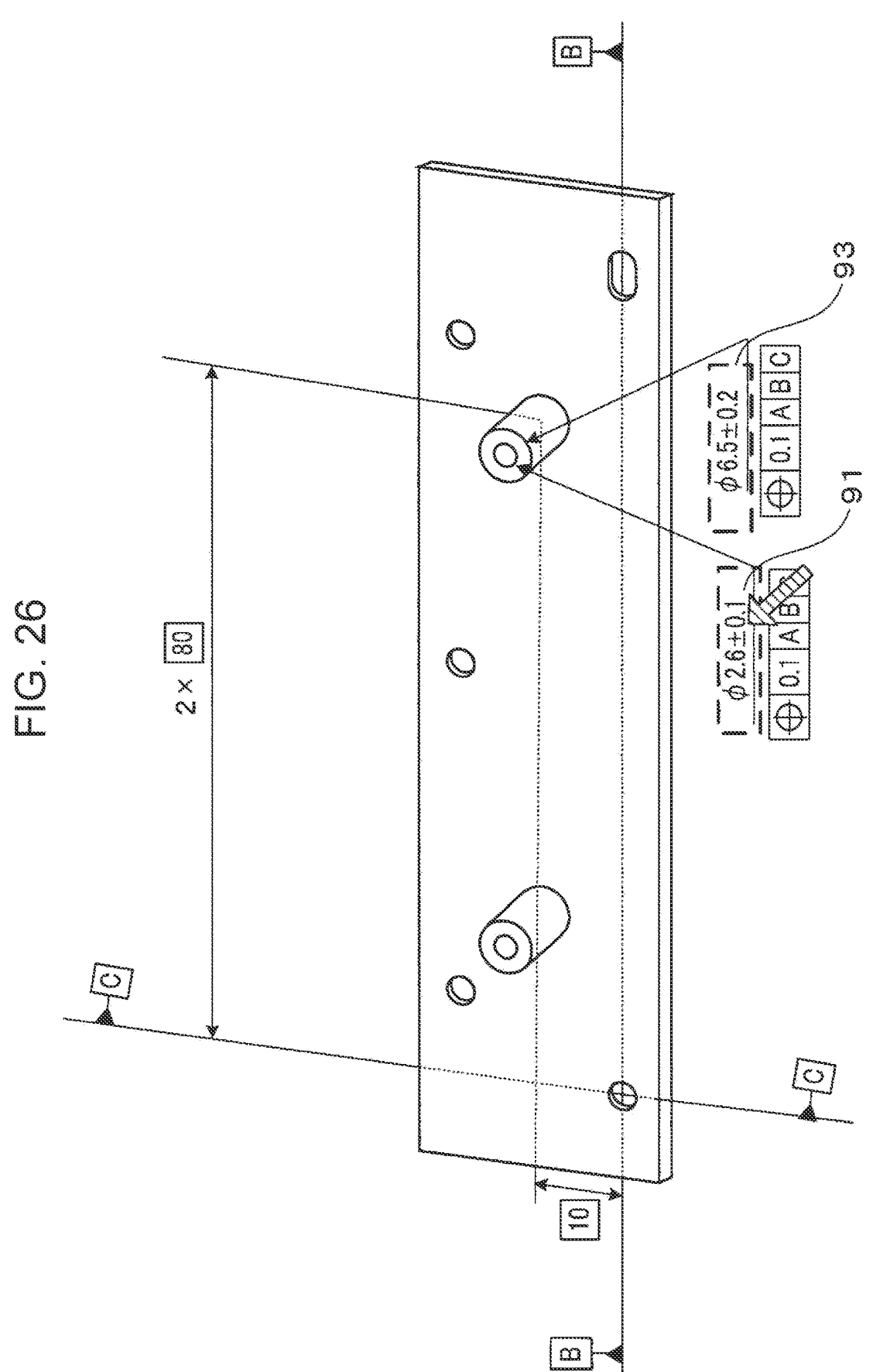
FIG. 26 is a diagram illustrating an example where the other size tolerance has been selected and only pieces of PMI belonging to the same set as the selected size tolerance are displayed through filtering.

For example, FIG. 26 illustrates an example where the size tolerance 91 has been selected and only pieces of PMI belonging to the same set as the selected size tolerance 91 are displayed through filtering.

In FIG. 26, since the size tolerance 91 has been selected, and only the size tolerance 93 belonging to the same set as the selected size tolerance 91 is displayed, and other pieces of PMI are not displayed.

Next, a method for automatically generating an inspection table on the basis of drawing data after relationships between the above-described plurality of pieces of PMI are determined will be described.

Figure 27:
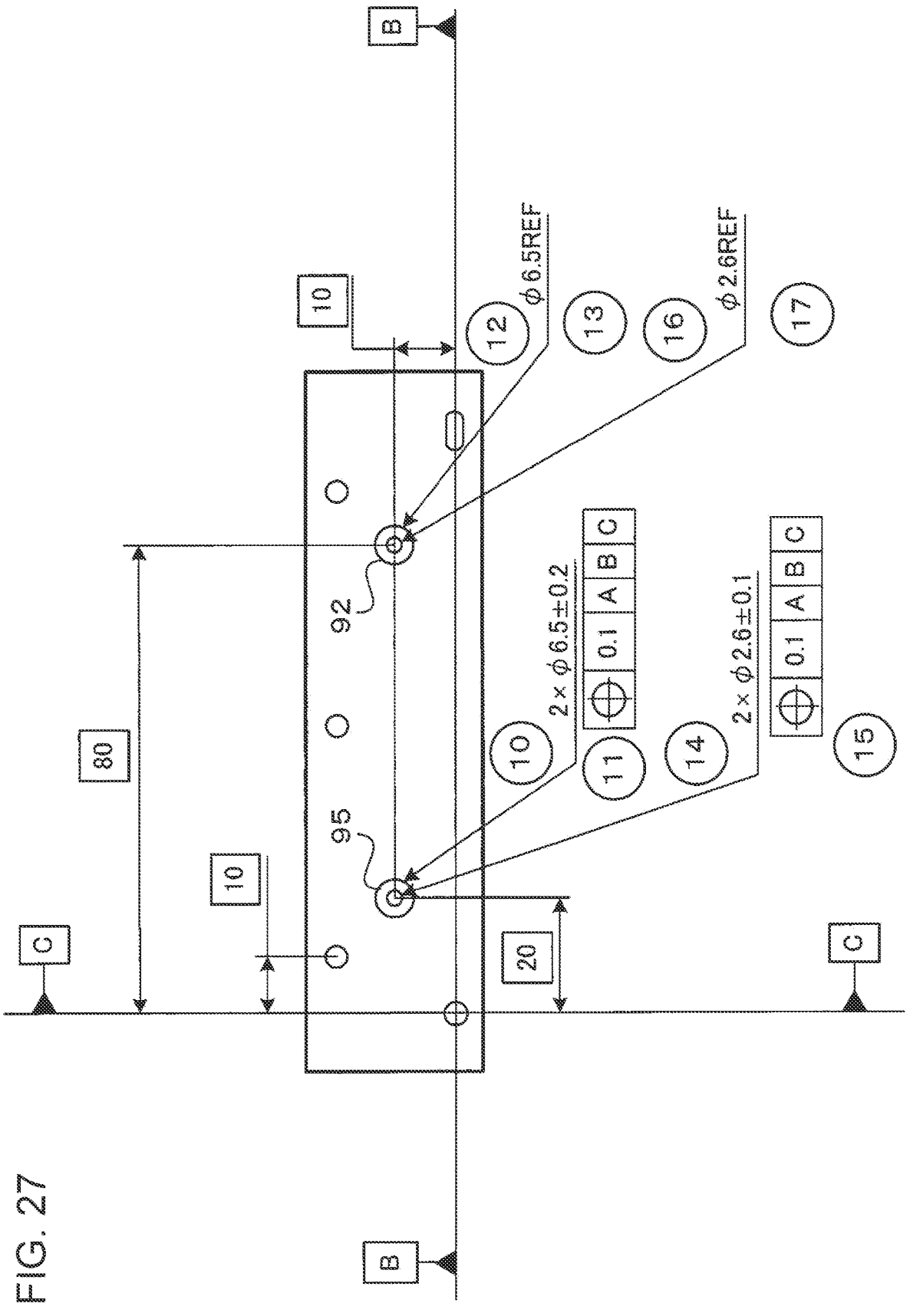
FIG. 27 is a diagram illustrating an example of three-dimensional model data in which inspection numbers are set.

First, it is assumed that inspection numbers illustrated in FIG. 27 are set on three-dimensional model data. In FIG. 27, only pieces of PMI regarding the two cylindrical bosses 92 and 95 having the inner diameter of 2.6 mm and the outer diameter of 6.5 mm are displayed and inspection numbers other than 10 to 17 and other pieces of PMI are omitted, in order to simplify the description.

In FIG. 27, a size tolerance of the outer diameter of the cylindrical boss 95, a geometric tolerance of the outer diameter of the cylindrical boss 95, a size tolerance of the outer diameter of the cylindrical boss 92, and a geometric tolerance of the outer diameter of the cylindrical boss 92 are given inspection numbers 10, 11, 12, and 13, respectively.

In addition, in FIG. 27, a size tolerance of the inner diameter of the cylindrical boss 95, a geometric tolerance of the inner diameter of the cylindrical boss 95, a size tolerance of the inner diameter of the cylindrical boss 92, and a geometric tolerance of the inner diameter of the cylindrical boss 92 are given inspection numbers 14, 15, 16, and 17, respectively.

Figure 28:
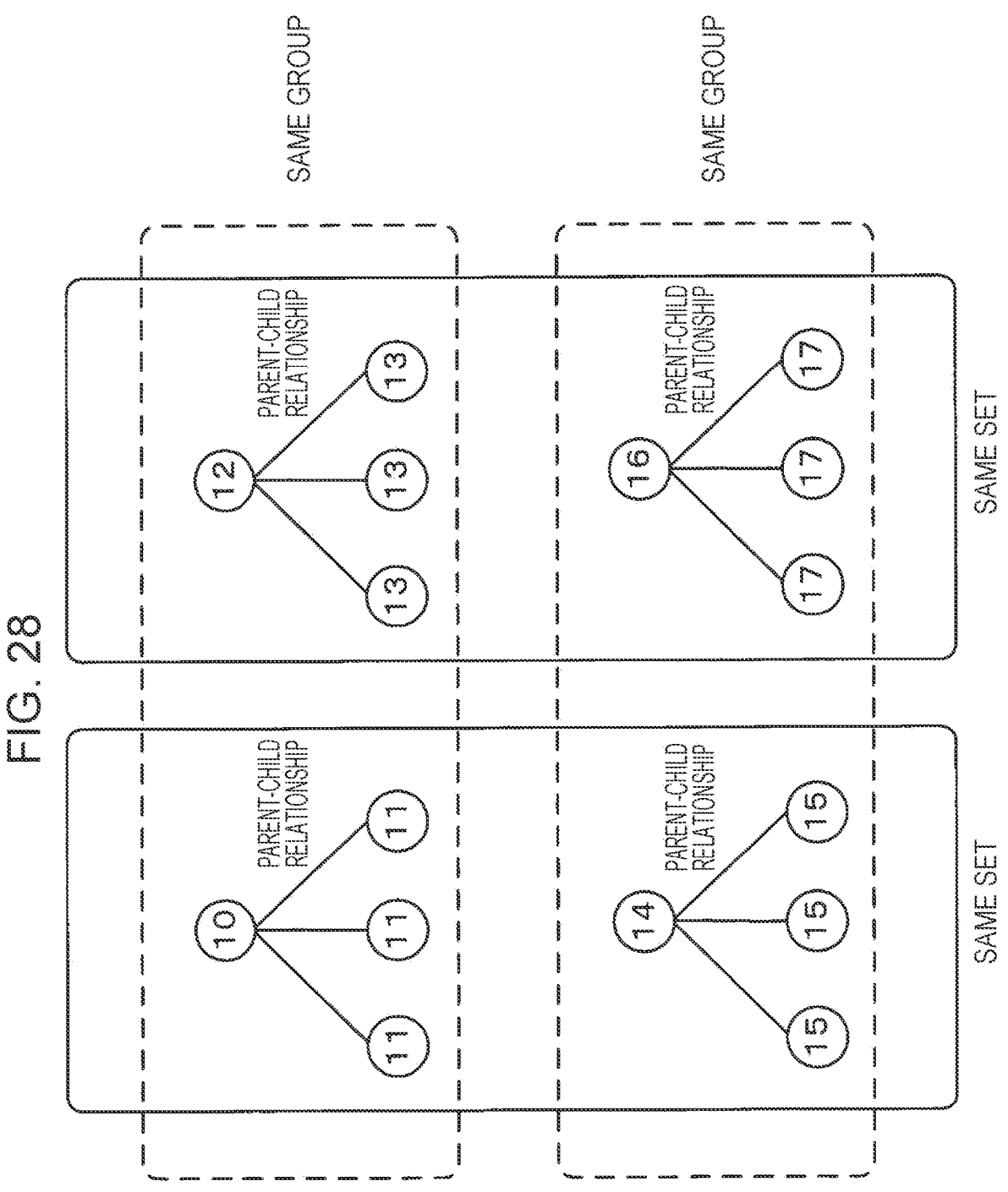
FIG. 28 is a diagram illustrating relationships between pieces of PMI, to which inspection numbers 10 to 17 are given, regarding inspection targets.

FIG. 28 illustrates relationships between pieces of PMI, to which the inspection numbers 10 to 17 are given, regarding inspection targets.

In FIG. 28, the size tolerance with the inspection number 10 and the geometric tolerance with the inspection number 11 have a parent-child relationship where the size tolerance with the inspection number 10 is a parent and the geometric tolerance with the inspection number 11 is a child. The size tolerance with the inspection number 12 and the geometric tolerance with the inspection number 13 have a parent-child relationship where the size tolerance with the inspection number 12 is a parent and the geometric tolerance with the inspection number 13 is a child.

Similarly, the size tolerance with the inspection number 14 and the geometric tolerance with the inspection number 15 have a parent-child relationship where the size tolerance with the inspection number 14 is a parent and the geometric tolerance with the inspection number 15 is a child. The size tolerance with the inspection number 16 and the geometric tolerance with the inspection number 17 have a parent-child relationship where the size tolerance with the inspection number 16 is a parent and the geometric tolerance with the inspection number 17 is a child.

Since the pieces of PMI with the inspection numbers 10 and 11 and the pieces of PMI with the inspection numbers 12 and 13 define dimensions of the outer diameters of the cylindrical bosses 92 and 95, the pieces of PMI with the inspection numbers 10 and 11 and the pieces of PMI with the inspection numbers 12 and 13 belong to the same group. Since the pieces of PMI with the inspection numbers 14 and 15 and the pieces of PMI with the inspection numbers 16 and 17 define dimensions of the inner diameters of the cylindrical bosses 92 and 95, the pieces of PMI with the inspection numbers 14 and 15 and the pieces of PMI with the inspection numbers 16 and 17 belong to the same group.

Furthermore, since the pieces of PMI with the inspection numbers 10 and 11 and the pieces of PMI with the inspection numbers 14 and 15 define the dimensions of the inner diameter and the outer diameter of the cylindrical boss 95 having the same central axis, the pieces of PMI with the inspection numbers 10 and 11 and the pieces of PMI with the inspection numbers 14 and 15 belong to the same set. Since the pieces of PMI with the inspection numbers 12 and 13 and the pieces of PMI with the inspection numbers 16 and 17 define the dimensions of the inner diameter and the outer diameter of the cylindrical boss 92 having the same central axis, the pieces of PMI with the inspection numbers 12 and 13 and the pieces of PMI with the inspection numbers 16 and 17 belong to the same set.

FIG. 29 illustrates an example of an inspection table generated by arranging, by groups, the pieces of PMI regarding the inspection targets with the relationships between the pieces of PMI determined.

In FIG. 29, the pieces of PMI regarding the inspection targets are arranged by groups in ascending order of inspection numbers, and the pieces of PMI with the same dimension of the inspection targets are arranged next to each other. More specifically, the pieces of PMI with the dimension of 6.5 mm are arranged next to each other, and the pieces of PMI with the dimension of 2.6 mm are arranged next to each other.

By performing inspections on the basis of the inspection table illustrated in FIG. 29, the parts having the same specifications can be successively inspected.

With the inspection table illustrated in FIG. 29, however, the outer diameters of the cylindrical bosses 92 and 95, which are physically apart from each other, are measured, and then the inner diameters of the cylindrical bosses 92 and 95, which are physically apart from each other, are measured.

FIG. 30 illustrates an example of an inspection table generated by arranging, by sets, the pieces of PMI regarding the inspection targets with the relationships between the pieces of PMI determined.

In FIG. 30, the pieces of PMI regarding the inspection targets are arranged by sets, that is, inspection targets relating to the same form are arranged next to each other. More specifically, inspection targets relating to the dimensions of the cylindrical boss 95 are arranged next to each other, and inspection targets relating to the dimensions of the cylindrical boss 92 are arranged next to each other.

By performing inspections on the basis of the inspection table illustrated in FIG. 30, inspections on the same form can be successively performed.

When a person checks results of the inspections, the pieces of PMI may be output to the inspection table by groups so that the inspection targets having the same dimensions and tolerances are arranged next to each other for comparison. When an inspection apparatus checks the results of the inspections, the pieces of PMI may be output to the inspection apparatus by sets so that the inspections can be efficiently performed by finishing all inspections on a part and proceeding to inspections on a next part. The pieces of PMI may thus be output in appropriate order or only pieces of PMI regarding an appropriate target may be output in accordance with purposes of use of the pieces of PMI.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
    determine a relationship between first product manufacturing information and second product manufacturing information included in three-dimensional model data;
    generate, on a basis of the determined relationship, information indicating the relationship between the first product manufacturing information and the second product manufacturing information;
    receive a user-entered selection of a product manufacturing information item displayed on a display apparatus;
    filter, based on the generated information indicating the relationship, product manufacturing information items that belong to a same group or set as the selected product manufacturing information item; and
    display, on the display apparatus, the filtered product manufacturing information items.

2. The information processing apparatus according to claim 1,
    wherein the processor is configured to recognize a form relating to a three-dimensional shape indicated by the first product manufacturing information and the second product manufacturing information and determine the relationship between the first product manufacturing information and the second product manufacturing information on a basis of the recognized form.

3. The information processing apparatus according to claim 2,
    wherein the processor is configured to determine that there is a relationship between product manufacturing information which defines a geometric tolerance and product manufacturing information which defines a theoretically exact dimension indicating a same form as the geometric tolerance does and generates information indicating a parent-child relationship where the product manufacturing information which defines the geometric tolerance is a parent and the product manufacturing information which defines the theoretically exact dimension is a child.

4. The information processing apparatus according to claim 3,
    wherein the processor is configured to include the generated information indicating the relationship between the first product manufacturing information and the second product manufacturing information in one or both of the first product manufacturing information and the second product manufacturing information.

5. The information processing apparatus according to claim 2,
    wherein the processor is configured to determine that there is a correspondence between at least two pieces of product manufacturing information in which defined geometric tolerances or size tolerances indicate a same form and generate information indicating that the at least two pieces of product manufacturing information have the correspondence.

6. The information processing apparatus according to claim 5,
    wherein the processor is configured to determine that the at least two pieces of product manufacturing information determined to have the correspondence belong to a same group and generate information indicating that the at least two pieces of product manufacturing information belong to the same group.

7. The information processing apparatus according to claim 6,
    wherein the processor is configured to include the generated information indicating the relationship between the first product manufacturing information and the second product manufacturing information in one or both of the first product manufacturing information and the second product manufacturing information.

8. The information processing apparatus according to claim 5,
    wherein the processor is configured to include the generated information indicating the relationship between the first product manufacturing information and the second product manufacturing information in one or both of the first product manufacturing information and the second product manufacturing information.

9. The information processing apparatus according to claim 2,
    wherein the processor is configured to include the generated information indicating the relationship between the first product manufacturing information and the second product manufacturing information in one or both of the first product manufacturing information and the second product manufacturing information.

10. The information processing apparatus according to claim 1,
    wherein the processor is configured to determine that there is a relationship between product manufacturing information which defines a geometric tolerance or product manufacturing information which defines a size tolerance and product manufacturing information which defines supplementary information regarding the foregoing product manufacturing information and generate information indicating a parent-child relationship where the product manufacturing information which defines the geometric tolerance or the size tolerance is a parent and the product manufacturing information which defines the supplementary information is a child.

11. The information processing apparatus according to claim 10,
    wherein the processor is configured to include the generated information indicating the relationship between the first product manufacturing information and the second product manufacturing information in one or both of the first product manufacturing information and the second product manufacturing information.

12. The information processing apparatus according to claim 1,
    wherein the processor is configured to determine that at least two pieces of product manufacturing information which define a same size tolerance or at least two pieces of product manufacturing information which define a same geometric tolerance belong to a same group and generate information indicating the at least two pieces of product manufacturing information belong to the same group.

13. The information processing apparatus according to claim 1, wherein the processor is configured to include the generated information indicating the relationship between the first product manufacturing information and the second product manufacturing information in one or both of the first product manufacturing information and the second product manufacturing information.

14. The information processing apparatus according to claim 1, wherein the processor is configured to hold the generated information indicating the relationship between the first product manufacturing information and the second product manufacturing information without including the generated information in the first product manufacturing information or the second product manufacturing information.

15. The information processing apparatus according to claim 1, wherein the processor is configured to output the generated information indicating the relationship between the first product manufacturing information and the second product manufacturing information while including the generated information in the three-dimensional model data.

16. The information processing apparatus according to claim 1, wherein the processor is configured to output the first product manufacturing information and the second product manufacturing information in order based on the information indicating the relationship between the first product manufacturing information and the second product manufacturing information.

17. The information processing apparatus according to claim 1, wherein the processor is configured to output only product manufacturing information filtered on a basis of the information indicating the relationship between the first product manufacturing information and the second product manufacturing information.

18. The information processing apparatus according to claim 1, wherein the processor is configured to display the three-dimensional model data on a display apparatus using the information indicating the relationship between the first product manufacturing information and the second product manufacturing information.

19. A non-transitory computer readable medium storing a program causing a computer to execute a process comprising:

determining a relationship between first product manufacturing information and second product manufacturing information included in three-dimensional model data;

generating, on a basis of the determined relationship, information indicating the relationship between the first product manufacturing information and the second product manufacturing information;

receiving a user-entered selection of a product manufacturing information item displayed on a display apparatus;

filtering, based on the generated information indicating the relationship, product manufacturing information items that belong to a same group or set as the selected product manufacturing information item; and displaying, on the display apparatus, the filtered product manufacturing information items.

20. A method comprising:

determining a relationship between first product manufacturing information and second product manufacturing information included in three-dimensional model data;

generating, on a basis of the determined relationship, information indicating the relationship between the first product manufacturing information and the second product manufacturing information;

receiving a user-entered selection of a product manufacturing information item displayed on a display apparatus;

filtering, based on the generated information indicating the relationship, product manufacturing information items that belong to a same group or set as the selected product manufacturing information item; and displaying, on the display apparatus, the filtered product manufacturing information items.

* * * * *